United States Patent [19]

Ohmura et al.

[11] Patent Number: 4,926,955
[45] Date of Patent: May 22, 1990

[54] REAR WHEEL STEERING APPARATUS FOR AUTOMOBILE

[75] Inventors: Hiroshi Ohmura, Higashihiroshima; Takashi Nakashima, Hiroshima, both of Japan

[73] Assignee: Mazda Motor Corporation, Hiroshima, Japan

[21] Appl. No.: 273,087

[22] Filed: Nov. 18, 1988

[30] Foreign Application Priority Data

Nov. 20, 1987 [JP] Japan ............................ 62-293288

[51] Int. Cl.$^5$ .................... B62D 6/00; B62D 7/14
[52] U.S. Cl. .................... 180/140; 180/142; 180/143; 280/91; 364/426.05
[58] Field of Search .................... 180/140, 142, 143; 280/91; 364/426.05

[56] References Cited

FOREIGN PATENT DOCUMENTS

| | | |
|---|---|---|
| 59-81274 | 5/1984 | Japan . |
| 59-81275 | 5/1984 | Japan . |
| 60-44185 | 10/1985 | Japan . |
| 62-5974 | 2/1987 | Japan . |
| 62-168762 | 7/1987 | Japan .................... 180/140 |
| 62-218284 | 9/1987 | Japan .................... 180/140 |
| 62-238171 | 10/1987 | Japan .................... 180/140 |
| 63-49588 | 3/1988 | Japan .................... 180/140 |
| 63-64871 | 3/1988 | Japan .................... 180/140 |

Primary Examiner—Charles A. Marmor
Assistant Examiner—Mitchell Bompey
Attorney, Agent, or Firm—Staas & Halsey

[57] ABSTRACT

A rear wheel steering apparatus for an automobile detects a vehicle speed and turns rear wheels at a rear wheel turning angle ratio according to the detected vehicle speed upon turning of front wheels. The apparatus includes a vehicle speed detection section for detecting a vehicle speed, a setting section for setting a rear wheel turning angle ratio in accordance with the vehicle speed detected by the vehicle speed detection section, a travel detection section detecting a travel state of a vehicle, a change section for changing turning angle ratio control by the setting section to fail-safe control when a detection output from the vehicle speed detection section is zero and the travel detection section detects the travel state of the vehicle, a brake detection section for detecting a brake operation state, and an inhibition section for inhibiting a change from the normal turning angle ratio control to the fail-safe control by the change section when the brake detection section detects a brake operation state.

24 Claims, 10 Drawing Sheets

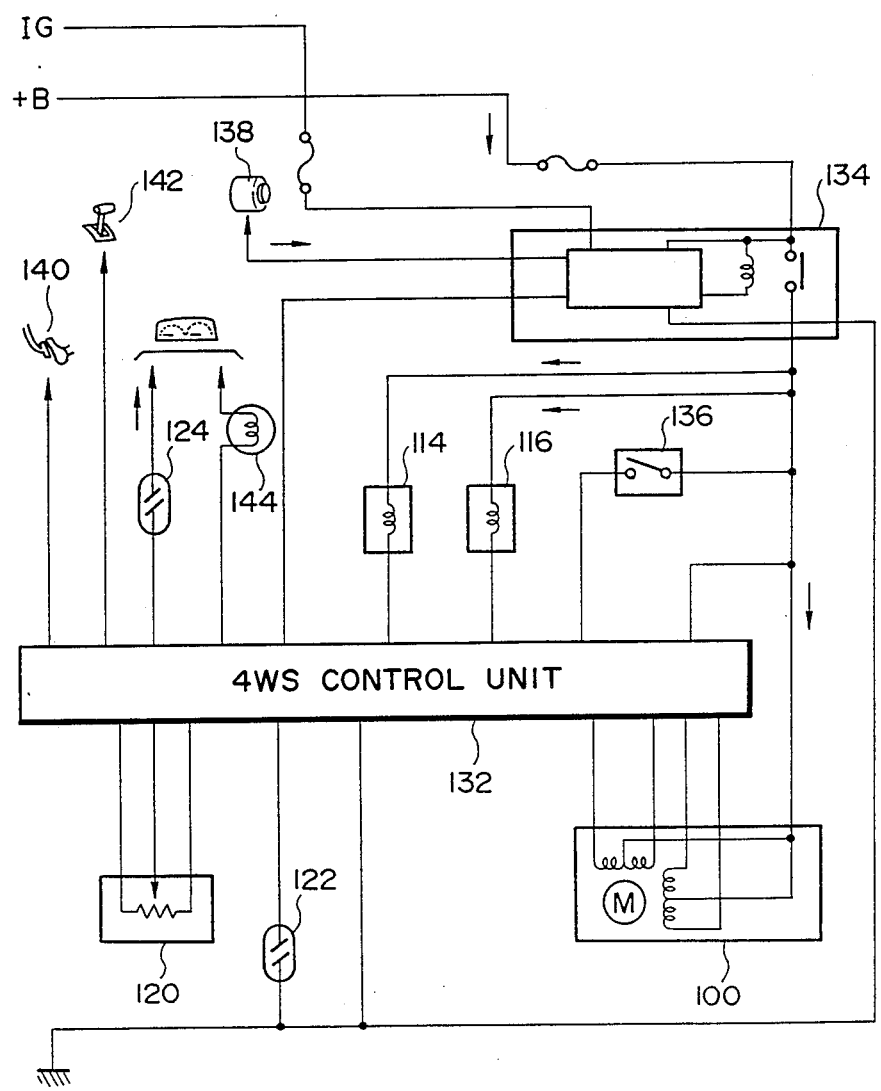
F I G. 4

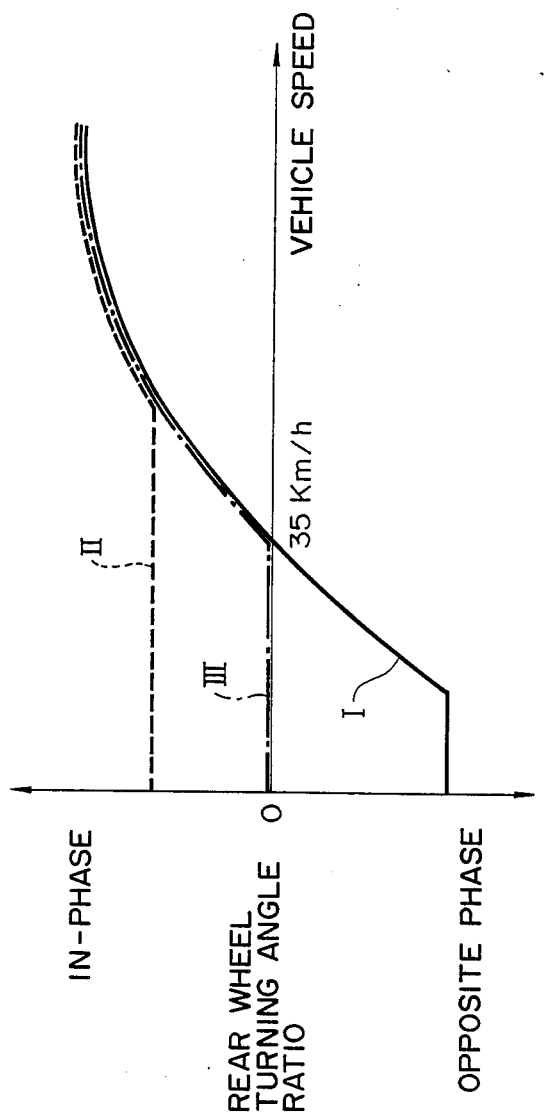
F I G. 5

REAR WHEEL STEERING APPARATUS FOR AUTOMOBILE

BACKGROUND OF THE INVENTION

The present invention relates to a rear wheel steering apparatus for an automobile for turning rear wheels together with front wheels upon operation of a steering wheel and, more particularly, to a rear wheel steering apparatus for an automobile capable of changing a ratio of a rear wheel turning angle to a front wheel turning angle (to be referred to simply as a rear wheel turning angle ratio hereinafter) in accordance with a vehicle speed.

A known four-wheel steering apparatus comprising a rear wheel steering apparatus for an automobile (or vehicle) turns front and rear wheels in accordance with an operation of a steering wheel, and changes the rear wheel turning angle ratio based on a predetermined rear wheel turning angle ratio characteristic in accordance with a vehicle speed, as disclosed in Japanese Patent Publication No. 60-44185. In this case, the rear wheel turning angle ratio characteristic is set as follows. More specifically, the front and rear wheels are turned in an opposite phase state at a low vehicle speed lower than a predetermined vehicle speed (e.g., 35 km/h) to improve a turning radius of a vehicle. At the predetermined vehicle speed, the rear wheels are not turned to set a so-called 2WS mode. At a high vehicle speed higher than the predetermined vehicle speed, the front and rear wheels are steered in an in-phase state to set a so-called 4WS mode, thereby improving travel stability of a vehicle (lane change stability).

In a conventional rear wheel steering apparatus of this type, when a vehicle travels along a curved road at a vehicle speed higher than the predetermined vehicle speed, since the front and rear wheels are turned in the in-phase state, a so-called high-speed cornering characteristic can be maintained well. During high-speed cornering, if a driver finds an obstacle ahead and quickly depresses a brake pedal, the vehicle is quickly decelerated, and the rear wheel turning angle ratio is quickly changed to the opposite phase state, accordingly. For this reason, in order to maintain a stable vehicle position during cornering and to assure stable travel, the front and rear wheels must firmly grip the road surface. Nevertheless, the degree of in-phase state is decreased, and finally, the rear wheels are turned in the opposite phase state. As a result, an inertial force acts in a vehicle body to generate a yaw rate, and accidental turning tendency of the vehicle is enhanced. Such a phenomenon appears as a so-called tuck-in phenomenon.

In particular, when the rear wheels are locked and slip by braking, the following problems are posed. That is, in this case, although the vehicle body travels at a certain speed, a vehicle speed sensor used for controlling the rear wheel turning angle ratio detects a wheel speed. For this reason, the output from the vehicle speed sensor immediately becomes zero upon locking. As a result, the rear wheel turning angle ratio is immediately changed to the maximum value of the opposite phase state according to the detection result from the vehicle speed sensor. In combination with a decrease in gripping force of tires upon locking, a very unstable travel state may occur.

For this reason, as disclosed in Japanese Utility Model Publication No. 62-5974, in a vehicle-speed sensitive rear wheel steering apparatus for a vehicle, when a quick deceleration of a vehicle is detected, the rear wheel turning angle ratio is set in an in-phase range to obtain a steering angle corresponding to the travel condition of the vehicle (an angle for increasing a slip angle), thereby preventing so-called tuck-in.

As disclosed in Japanese Patent Laid-Open (Kokai) No. 59-81275, in a vehicle-speed sensitive rear wheel steering apparatus for a vehicle, when a quick deceleration of a vehicle is detected, a change in rear wheel turning angle ratio is delayed to prevent the above-mentioned tuck-in phenomenon.

As a known means for detecting the quick deceleration of the vehicle, a vehicle speed sensor is used, and the quick deceleration is determined when the output from the vehicle speed sensor is quickly decreased. Alternatively, both a brake sensor and the vehicle speed sensor are used, and the quick deceleration is determined when the output from the vehicle speed sensor is quickly decreased after a brake pedal is depressed.

As disclosed in Japanese Patent Laid-Open (Kokai) No. 59-81274, upon quick deceleration, as alternative means of a technique for delaying a change in rear wheel turning angle ratio, a means for fixing the rear wheel turning angle ratio or a means for setting the rear wheel turning angle ratio to "0" to set the 2WS mode is known.

However, in these prior arts, after the quick deceleration of a vehicle is detected, the rear wheel turning angle ratio is controlled to prevent tuck-in. For this reason, the following problems are posed.

More specifically, when a quick deceleration of a vehicle is detected, a time of generation of the quick deceleration is very short, e.g., in the order of several hundreds of msec. Meanwhile, a sampling time of the vehicle speed sensor for controlling the rear wheel turning angle ratio is 131 msec at present. For this reason, in actual deceleration detection, only 2 to 3 detection results can only be obtained every 131 msec, and it is impossible to calculate the deceleration per unit time based on such a small amount of data so as to accurately determine whether or not the present deceleration falls in a quick deceleration range. In this manner, the conventional apparatus can only discriminate a deceleration with considerable inaccuracy.

When the rear wheel turning angle ratio is to be changed based on such an inaccurate quick deceleration discrimination result, a quick deceleration may be erroneously discriminated even if it is not so. If such erroneous discrimination is made, although the rear wheel turning angle ratio should be set in an opposite phase state as the vehicle speed is decreased, the in-phase state is maintained. Although the rear wheel turning angle ratio should be, for example, fixed to maintain a safe travel state when a vehicle is quickly decelerated in practice, the quick deceleration cannot be determined due to inaccuracy of the vehicle speed sensor, and the rear wheel turning angle ratio is not fixed but may be changed in an opposite phase state. Thus, a travel property of the vehicle is greatly impaired due to inaccuracy of the current vehicle speed sensor.

Since this vehicle speed sensor is conventionally of a contact type, so-called chattering often occurs. When chattering occurs in the vehicle speed sensor, a control mechanism determines a quick acceleration since an input signal is temporarily increased. Meanwhile, when the chattering terminates, the normal number of input signals is recovered. Therefore, the control mechanism determines a quick deceleration as a reaction of the preceding quick acceleration discrimination.

In this manner, when a quick deceleration is erroneously determined, the rear wheel turning angle ratio is fixed in the in-phase state although it need not be fixed, and the travel property of the vehicle is impaired.

In the vehicle-speed sensitive rear wheel steering apparatus using the existing vehicle speed sensor, a travel property may be impaired due to inaccuracy of the vehicle speed sensor, and since only the quick deceleration is taken into consideration, an unnecessary or erroneous fixing operation of a rear wheel turning angle ratio is performed, and a travel property is spoiled.

When a quick deceleration of a vehicle is detected or when both the vehicle speed sensor and the brake sensor are used, the following problems are pointed out in addition to the above-mentioned problems of the vehicle speed sensor.

When a vehicle travels along a road of a bad condition, if a wheel climbs over a projecting portion of a three-dimensional pattern on the road surface while a brake pedal is being depressed, the rotational speed of the wheel is instantaneously decreased, and the detection result of the vehicle speed sensor may fall in the quick deceleration range. In this case, if this travel state occurs during cornering, the rear wheel steering angle ratio is fixed in the in-phase state in the conventional apparatus. Therefore, even if a driver intends to perform cornering with good turnability in the opposite phase state, the vehicle cannot be turned well, and a travel property is considerably impaired.

In this manner, in the conventional apparatus, when the brake pedal is quickly depressed to avoid danger during high-speed cornering, since control for fixing the rear wheel turning angle ratio in the in-phase state is performed in consideration of only the quick deceleration in the vehicle speed sensor, an unnecessary or erroneous fixing operation of the rear wheel turning angle ratio is performed, and a travel property is spoiled.

SUMMARY OF THE INVENTION

The present invention has been made in consideration of the above problems, and has as its first object to provide a rear wheel steering apparatus for an automobile which can satisfactorily maintain a travel property matching with a travel state during cornering.

In the prior art, if a deceleration is detected during turning at a constant steering angle, a rear wheel turning angle ratio K is changed to change the rear wheel turning angle even at the constant steering angle. As a result, the tuck-in phenomenon occurs, and a driver feels uneasy and cannot easily drive the vehicle. In consideration of this problem, the prior art employs a means for fixing the rear wheel turning angle ratio during deceleration, and so on.

That is, it can be considered that the prior art employs a vehicle body speed (actual vehicle speed) and a value of a vehicle speed sensor (detected vehicle speed) while they coincide with each other. Therefore, the prior art adopts an arrangement wherein a rear wheel turning angle ratio is fixed at a point corresponding to a deceleration (B) for preventing tuck-in or more. As can be understood from this, there is no doubt that the prior art corresponds to the generic concept of the present invention wherein the rear wheel turning angle ratio is fixed at a point corresponding to a deceleration (A) at which wheels are locked.

However, since the prior art has (B) as an object to be controlled, it only detects a deceleration, and in this case, various problems are posed as described in this specification. Since often not only (B) but also (A) may not be detected, a problem is posed. In this invention, a deceleration region of (B) corresponds to a region wherein the vehicle body speed coincides with the value of the vehicle speed sensor. Therefore, the rear wheel turning angle ratio can be controlled based on the sensor value, thus posing no problem. However, in a region of (A), it is dangerous if the rear wheel turning angle ratio cannot be reliably fixed. Thus, the present invention provides control capable of reliably detecting the region of (A).

In the region of (A), the vehicle body speed is different from the value of the vehicle speed sensor, the rear wheel turning angle ratio becomes a maximum value in the opposite phase state, and the tires lose a gripping force since the wheel are locked. Therefore, the present inventors considered that this region must be reliably controlled.

In order to attain the above first object, according to a first aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: discrimination means for discriminating a travel state; first setting means for, when the discrimination means discriminates a normal travel state, setting a rear wheel turning angle ratio based on a first characteristic according to the detected vehicle speed; and second setting means for, when the discrimination means detects that wheels are locked, setting the rear wheel turning angle ratio based on a second characteristic for stabilization.

In the first aspect of the rear wheel steering apparatus for an automobile with the above arrangement, when locking of wheels is detected, a control mode is changed from normal rear wheel turning angle ratio change control to rear wheel turning angle ratio change control having a characteristic for stabilization. In this manner, even if wheels are locked, a travel state of a vehicle can be safely controlled.

It is a second object of the present invention to provide a rear wheel steering apparatus for an automobile, in which when lock control is performed upon detection of a lock state of wheels in order to satisfactorily maintain a travel property matching with a travel condition during cornering, fail-safe control is not erroneously performed and lock control can be reliably performed.

In order to attain the second object, according to a second aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: vehicle speed detection means for detecting a vehicle speed; setting means for setting a rear wheel turning angle ratio in accordance with the vehicle speed detected by the vehicle speed detection means; abnormality discrimination means for discriminating that an output from the vehicle speed detection means is quickly decreased over a predetermined value; change means for, when the abnormality discrimination means detects that the output from the vehicle speed detection means is quickly decreased, changing rear wheel turning angle control by said setting means to fail-safe control; brake detection means for detecting a brake operation state; and inhibition means for, when the brake detection means detects the brake operation state, inhibiting a change from the normal rear wheel turning angle ratio control to fail-safe control by the change means.

In the second aspect of the rear wheel steering apparatus for an automobile with the above arrangement, a lock state of wheels is detected under the condition that the brake detection means detects the brake operation state. A quick decrease in output from the vehicle speed detection means while the brake operation state is detected is discriminated not as a failure but as a lock state of the wheels. In this manner, when the brake detection means detects the brake operation state, a change from normal rear wheel turning angle ratio control to fail-safe control in the change means is inhibited.

It is a third object of the present invention to provide a rear wheel steering apparatus for an automobile, which can reliably prevent rear wheels from being turned at a wrong turning angle ratio upon erroneous lock detection of wheels.

In order to attain the above third object, according to a third aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: vehicle speed detection means for detecting a vehicle speed; discrimination means for discriminating a travel state; first setting means for, when the discrimination means discriminates a normal travel state, setting a rear wheel turning angle ratio based on a first characteristic according to the detected vehicle speed; second setting means for, when the discrimination means detects that wheels are locked, setting the rear wheel turning angle ratio based on a second characteristic different from the first characteristic; and inhibition means for, when a detection output from the vehicle speed detection means is quickly increased over a predetermined value, inhibiting setting in the second setting means.

In the third aspect of the rear wheel steering apparatus for an automobile with the above arrangement, when a lock state of wheels is detected, a control mode is changed from normal turning angle ratio control based on the first turning angle ratio characteristic to turning angle ratio control based on the second characteristic different from the first turning angle ratio characteristic. When the detection output from the vehicle speed detection means is quickly increased over the predetermined value, the inhibition means inhibits setting in the second setting means. In this manner, even if a vehicle speed is quickly increased, the rear wheel turning angle ratio is kept to have the first characteristic, and the automobile can be controlled with good travel property.

It is a fourth object of the present invention to provide a rear wheel steering apparatus for an automobile, in which when lock control is performed upon detection of a lock state of wheels in order to satisfactorily maintain a travel property matching with a travel condition during cornering, after the lock state of the wheels is released, lock control is quickly canceled, and normal rear wheel turning angle ratio control is recovered to keep travel stability in a normal travel state and to improve product quality.

The fourth object can be attained by fourth to seventh aspects of a rear wheel steering apparatus for an automobile below.

That is, in order to attain the fourth object described above, according to a fourth aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: vehicle speed detection means for detecting a vehicle speed; lock detection means for detecting a lock state of wheels; setting means for, when the lock detection means detects the lock state of the wheels, changing a rear wheel turning angle ratio from a normal first characteristic to a second characteristic for stabilization to set a lock control state; and cancel means for, when a predetermined period of time has passed from detection of the lock state of the wheels by the lock detection means, changing the rear wheel turning angle ratio from the second characteristic to the first characteristic to cancel the lock control state.

In the fourth aspect of the rear wheel steering apparatus for an automobile with the above arrangement, lock control is canceled after a predetermined period of time has passed from detection of the lock state of the wheels. In this manner, after the lapse of the predetermined period of time, the vehicle speed detected by the vehicle speed detection means coincides with an actual vehicle speed. Since cancellation of the lock state of the wheels is discriminated in this manner, after the lock state of the wheels is actually released, the lock control state can be reliably canceled, and a normal rear wheel turning ratio angle control state can be recovered. Thus, travel stability in a normal travel state can be maintained, and product quality can be improved.

In order to attain the fourth object, according to a fifth aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: vehicle speed detection means for detecting a vehicle speed; lock detection means for detecting a lock state of wheels; setting means for, when the lock detection means detects the lock state of the wheels, changing a rear wheel turning angle ratio from a normal first characteristic to a second characteristic for stabilization to set a lock control state; and cancel means for, when the vehicle speed detected by the vehicle speed detection means substantially coincides with an actual vehicle speed, changing the rear wheel turning angle ratio from the second characteristic to the first characteristic to cancel the lock control state.

In the fifth aspect of the rear wheel steering apparatus for an automobile with the above arrangement, after the lock state of the wheels is detected, release of the lock state of the wheels is discriminated when the vehicle speed detected by the vehicle speed detection means substantially coincides with an actual vehicle speed. Since release of the lock state of the wheels is discriminated in this manner, the lock control state can be quickly canceled after the lock state of the wheels is actually released, and a normal rear wheel turning angle control state can be recovered. Thus, travel stability in a normal travel state can be maintained, and product quality can be improved.

In order to attain the fourth object, according to a sixth aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: vehicle speed detection means for detecting a vehicle speed; lock detection means for detecting a lock state of wheels; setting means for, when the lock detection means detects the lock state of the wheels, changing a rear wheel turning angle ratio from a normal first characteristic to a second characteristic for stabilization to set a lock control state; brake detection means for detecting a depression state of a brake pedal; and cancel means for, when a predetermined period of time has passed after detection of depression of the brake pedal by the brake detection means is stopped, changing the rear wheel turning angle ratio from the second characteristic to the first characteristic in the setting means to cancel the lock control state.

In the sixth aspect of the rear wheel steering apparatus for an automobile with the above arrangement, lock control is canceled when the predetermined period of time has passed after a braking force to the wheels is released. In this manner, after the lapse of the predetermined period of time, the wheels grip a road surface, and the vehicle speed detected by the vehicle speed detection means substantially coincides with an actual vehicle speed. When cancellation of the lock state of the wheels is discriminated in this manner, it is determined that no trouble is caused if the lock control state is canceled after the lapse of the predetermined period of time from detection of release of depression of the brake pedal by the brake detection means, and a normal rear wheel turning-angle ratio control state is recovered. As a result, travel stability in a normal travel state can be assured, and product quality can be improved.

In order to attain the fourth object, according to a seventh aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: vehicle speed detection means for detecting a vehicle speed; lock detection means for detecting a lock state of wheels; setting means for, when the lock detection means detects the lock state of the wheels, changing a rear wheel turning angle ratio from a normal first characteristic to a second characteristic for stabilization to set a lock control state; and cancel means for, when a vehicle speed signal excluding a signal indicating that a vehicle speed is zero is continuously input from the vehicle speed detection means for a predetermined period of time, changing the rear wheel turning angle ratio from the second characteristic to the first characteristic to cancel the lock control state.

In the seventh aspect of the rear wheel steering apparatus for an automobile with the above arrangement, when vehicle speed data excluding vehicle speed zero data is input from the vehicle speed detection means for a predetermined period of time after the lock state of the wheels is detected, it is determined that the lock state of the wheels is released and the wheels grip a road surface. When release of the lock state of the wheels is determined in this manner, the lock control state can be quickly canceled, and a normal rear wheel turning angle ratio control state can be recovered. As a result, travel stability in a normal travel state can be assured, and product quality can be improved.

It is a fifth object of the present invention to provide a rear wheel steering apparatus for an automobile which can quickly determine a lock state of wheels, and can reliably perform lock control.

In order to attain the fifth object, according to an eighth aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: a plurality of vehicle speed detection means for detecting a vehicle speed; setting means for setting a rear wheel turning angle ratio in accordance with the vehicle speeds detected by the plurality of vehicle speed detection means; and discrimination means for discriminating a lock state of wheels using the detection output from one of the plurality of vehicle speed detection means.

In the eighth aspect of the rear wheel steering apparatus for an automobile with the above arrangement, a detected vehicle speed used for setting a rear wheel turning angle ratio is determined based on vehicle speeds detected by two vehicle speed detection means, and a detected vehicle speed used for discriminating a lock state of the wheels employs a detected vehicle speed obtained from one of the two vehicle speed detection means. In this manner, the detected vehicle speed for lock discrimination is directly input to the discrimination means without being subjected to data processing, and lock discrimination can be quickly executed.

It is a sixth object of the present invention to provide a rear wheel steering apparatus for an automobile, in which when a lock state of wheels is detected to perform lock control in order to satisfactorily maintain travel property matching with a travel state during cornering, erroneous fail-safe control is prevented from being executed, and lock control can be reliably performed in an actual travel state, and to provide a rear wheel steering apparatus for an automobile which can prevent fail-safe control from being erroneously executed.

In order to attain the sixth object, according to a ninth aspect of the present invention, there is provided a rear wheel steering apparatus for an automobile for detecting a vehicle speed and turning rear wheels based on a rear wheel turning angle ratio according to the detected vehicle speed in accordance with a turning operation of front wheels, comprising: vehicle speed detection means for detecting a vehicle speed; setting means for setting a rear wheel turning angle ratio in accordance with the vehicle speed detected by the vehicle speed detection means; travel detection means for detecting a travel state of a vehicle; change means for, when a detection output from the vehicle speed detection means is zero and the travel detection means detects the travel state of the vehicle, changing turning angle ratio control by the setting means to fail-safe control; brake detection means for detecting a brake operation state; and inhibition means for, when the brake detection means detects the brake operation state, inhibiting a change from the normal turning angle ratio control to the fail-safe control by the change means.

In the ninth aspect of the rear wheel steering apparatus for an automobile with the above arrangement, the lock state of wheels is detected under the condition that the brake detection means detects the brake operation state. Thus, an output zero state of the vehicle speed detection means in a state wherein the brake operation state is detected is determined not as a failure but as a lock state of wheels. An output zero state of the vehicle speed means in a state wherein the brake operation state is detected while the vehicle stands still is determined not as a failure but as a check state. As a result, when the brake operation state is detected by the brake detection means, a change from normal turning angle ratio control to fail-safe control by the change means is inhibited.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing a control unit of the rear wheel steering apparatus;

FIG. 5 is a graph showing various characteristics in rear wheel turning angle ratio control;

DETAILED DESCRIPTION OF THE PREFERRED EMBODIMENT

An embodiment of a rear wheel steering apparatus for an automobile according to the present invention will be described hereinafter with reference to the accompanying drawings.

Figure 1:
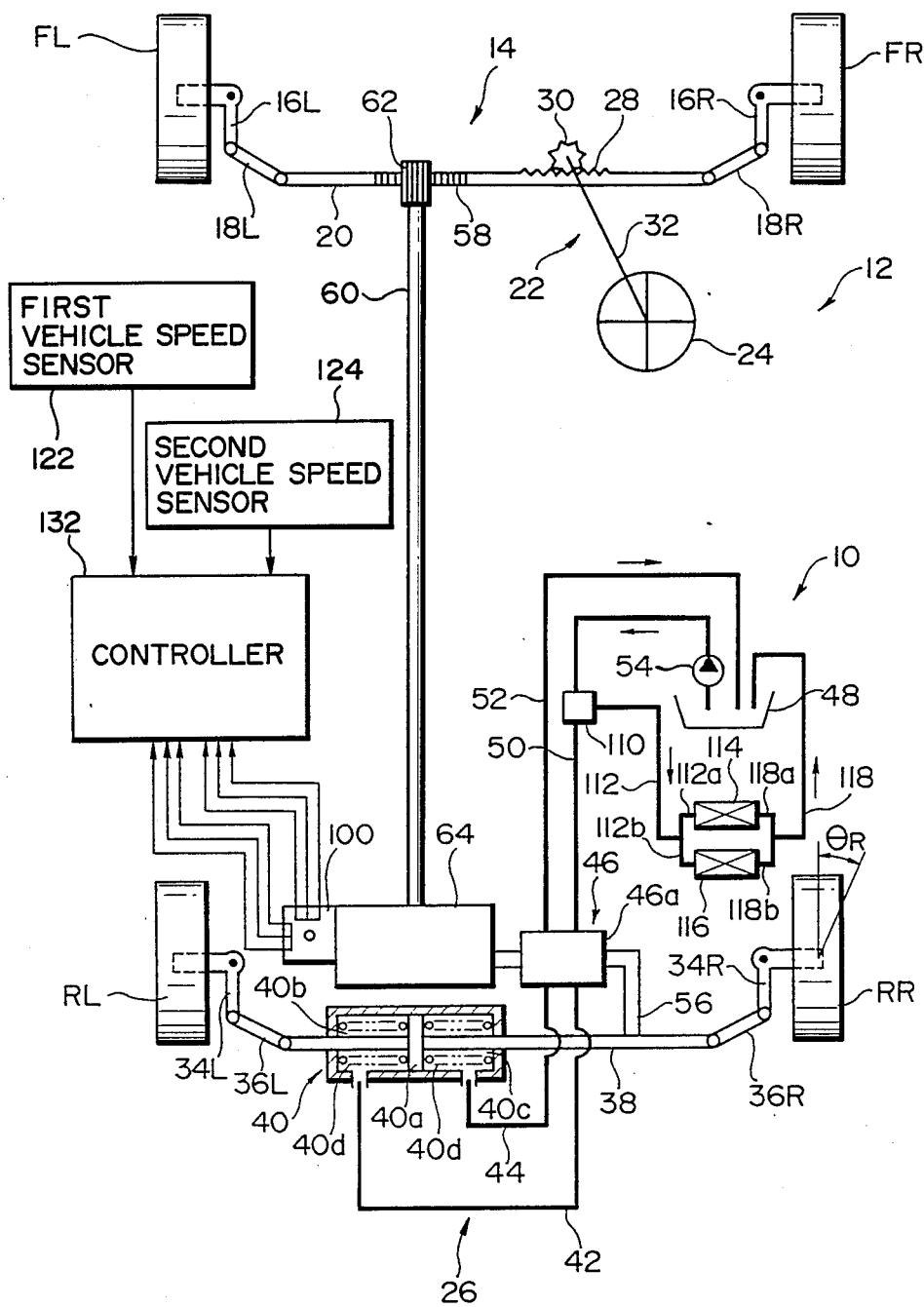
FIG. 1 is a plan view showing an arrangement of a four-wheel steering apparatus comprising an embodiment of a rear wheel steering apparatus for an automobile according to the present invention.
Figure 2:
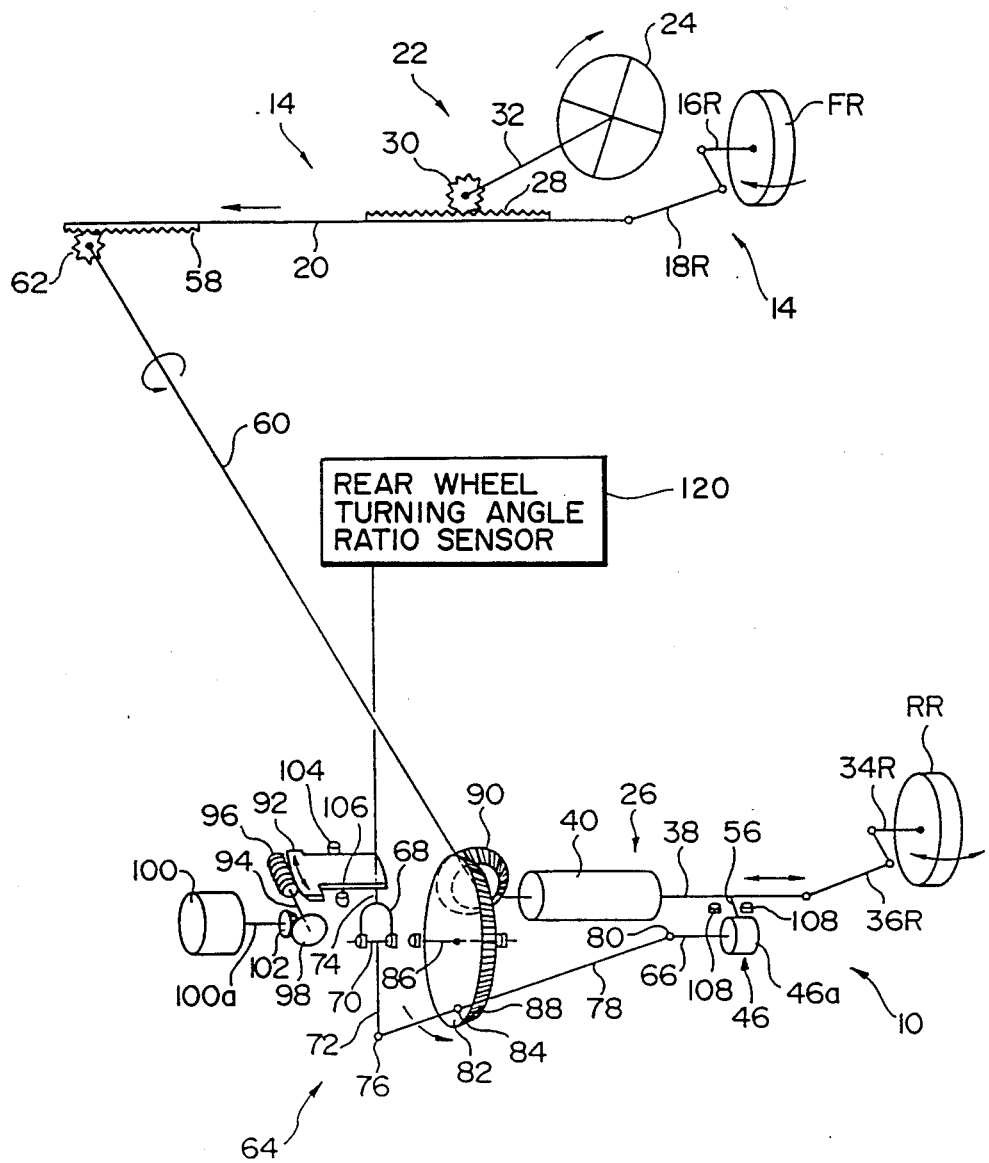
FIG. 2 is a perspective view schematically showing an arrangement of the rear wheel steering apparatus.

FIGS. 1 and 2 show a four-wheel steering mechanism 12 having a rear wheel steering apparatus 10 according to an embodiment of the present invention. In FIGS. 1 and 2, reference symbols FL, FR, RL, and RR denote four wheels of a vehicle steered by the four-wheel steering mechanism 12. The left and right front wheels FL and FR are connected to be turned by a front wheel steering apparatus 14, and the left and right rear wheels RL and RR are connected to be turned by the rear wheel steering apparatus 10.

The front wheel steering apparatus 14 is constituted by a pair of left and right knuckle arms 16L and 16R, tie rods 18L and 18R, and a relay rod 20 for coupling the left and right tie rods 18L and 18R. A steering wheel 24 is connected to the front wheel steering apparatus 14 through a rack and pinion steering mechanism 22. The steering mechanism 22 comprises a first rack 28 formed on the relay rod 20, and a steering shaft 32 having an upper end coupled to the steering wheel 24 and a lower end to which a first pinion 30 meshed with the first rack 58 is attached. In this manner, the left and right front wheels FL and FR can be turned in accordance with an operation (rotation) of the steering wheel 24.

The rear wheel steering apparatus 10 has left and right knuckle arms 34L and 34R, tie rods 36L and 36R, and a relay rod 38 for coupling the tie rods 36L and 36R as in the front wheel steering apparatus 14, and further has a hydraulic power steering mechanism 26. The power steering mechanism 26 is fixed to a vehicle body, and comprises a power cylinder 40 using the relay rod 38 as a piston rod.

A piston 40a is disposed in the power cylinder 40 to be in slidable contact with its inner surface and to be movable in the axial direction. The piston 40a is integrally attached to the relay rod 38. The interior of the power cylinder 40 is partitioned into two hydraulic chambers 40b and 40c by the relay rod 38 via piston 40a. These hydraulic chambers 40b and 40c are coupled to a control valve 46 through pipes 42 and 44, respectively. Two pipes, e.g., an oil supply pipe 50 and an oil exhaust pipe 52 extending to a reservoir tank 48 are connected to the control valve 46. A hydraulic pump 54 driven by an engine (not shown) is connected to the oil exhaust pipe 52.

The control valve 46 is of a known spool valve type The control valve 46 comprises a cylindrical valve casing 46a integrally mounted on the relay rod 38 through a coupling member 56, and a spool valve (not shown) fitted in the valve casing 46a. In the control valve 46 with this arrangement, a compressed oil from the hydraulic pump 54 is supplied to one hydraulic chamber 40b (or 40c) of the power cylinder 40 upon movement of the spool valve, and as a result, a drive force for the relay rod 38 can be assisted by the compressed oil.

Return springs 40d for biasing the relay rod 38 to a neutral position (a position where a turning angle $\theta R$ of the rear wheels RL and RR becomes zero) are respectively mounted in the hydraulic chambers 40b and 40c of the power cylinder 40 described above.

A second rack 58 is formed on the relay rod 20 of the front wheel steering apparatus 14 at a position different from the first rack 28 constituting the steering mechanism 22. A second pinion 62 mounted on the front end of a rear steering shaft 60 extending along the back-and-forth direction of the vehicle is meshed with the second rack 58. The rear end of the steering shaft 60 is coupled to the rear wheel steering apparatus 10 through a turning angle ratio control mechanism 64.

The turning angle ratio control mechanism 64 has a control rod 66 which is held to be slidable along a moving axis defined along the direction of a vehicle width, as shown in FIG. 2. One end of the control rod 66 is coupled to the spool valve in the control valve 46.

The turning angle ratio control mechanism 64 comprises a holder 68 having a U-shaped proximal end portion. A support pin 70 is pivotally and axially supported between the two ends of the U-shaped portion of the holder 68. A swing arm 72 is fixed to the central portion of the support pin 70 to be perpendicular thereto. More specifically, the swing arm 72 is swingably received by the holder 68 through the support pin 70. A support shaft 74 is fixed to the central portion of the holder 68. The support shaft 74 is supported on a casing (not shown) of the turning angle ratio control mechanism 64 fixed to the vehicle body to be pivotal about a pivot axis which is determined to be perpendicular to the moving axis of the control rod 66 described above.

In other words, the support pin 70 of the swing arm 72 is located at the intersection between both the axes (i.e., the moving axis of the control rod 66 and the pivot axis of the support shaft 74), and extends in a direction perpendicular to the pivot axis. When the holder 68 is pivoted about the pivot axis together with the support shaft 74, an inclination angle defined by the support pin 70 at its distal end and the moving axis of the control rod 66 is changed. More specifically, an inclination angle defined by a swing path plane of the swing arm 72 having the support pin 70 as the center and a plane perpendicular to the moving axis (to be referred to as a reference plane hereinafter) is changed.

One end of a connecting rod 78 is coupled to the distal end portion of the swing arm 72 through a ball joint 76. The other end portion of the connecting rod 78 is coupled to the other end portion of the control rod 60 through a ball joint 80. In this manner, the control rod 66 is displaced along the direction of the vehicle width according to the swing movement of the distal end of the swing arm 72.

The connecting rod 78 slidably extends through a through hole formed in an eccentric portion of a disk-like rotational force providing member 82 near the ball joint 76 through a ball joint 84. A large-diameter bevel gear 88 pivotally supported through a support shaft 86 located coaxially with the moving axis of the control rod 66 is formed integrally with the rotational force providing member 82. A small-diameter bevel gear 90 attached to the rear end of the rear steering shaft 60 is meshed with the large bevel gear 88. In this manner, the rotational force of the steering wheel 24 is transmitted to the rotational force providing member 82.

For this reason, the rotational force providing member 82 is rotated by an amount corresponding to a rotational angle of the steering wheel 24, and as a result, the connecting rod 78 is pivoted about the moving axis of the control rod 66. When the swing arm 72 is pivoted about the support pin 70 and when the axis of the support pin 70 coincides with the moving axis of the control rod 66 (at the neutral position), the ball joint 76 at the distal end of the swing arm 72 swings in only the reference plane, and the control rod 66 is kept in position without being moved along the moving axis.

When the axis of the support pin 70 is inclined with respect to the moving axis and when the swing path plane of the swing arm 72 is deviated from the reference plane, the ball joint 76 is displaced in the direction of the vehicle width upon swing movement of the swing arm 72 about the support pin 70. As a result, this displacement is transmitted to the control rod 66 through the connecting rod 78. The control rod 66 is then moved along the moving axis, and the spool valve of the control valve 46 is actuated.

Even if a swing angle of the swing arm 72 about the axis of the support pin 70 remains the same, the displacement of the control rod 66 in the right-and-left direction is changed upon a change in inclination angle of the support pin 70, that is, in pivot angle of the holder 68.

More specifically, if the axis of the support pin 70 forms an angle deviated clockwise from the moving axis of the control rod 66 (at the opposite phase position), the ball joint 76 at the distal end of the swing arm 72 swings obliquely across the reference plane, and the control rod 66 is deviated to the right in FIG. 2 upon clockwise steering operation of the steering wheel 24. When the control rod 66 is deviated to the right, the rear wheels RL and RR are steered counterclockwise, as will be described later. In other words, in this opposite phase state, the rear wheels are turned in a direction opposite to the turning direction of the front wheels.

Meanwhile, if the axis of the support pin 70 forms an angle deviated counterclockwise from the moving axis of the control rod 66 (at the in-phase position), the ball joint 76 at the distal end of the swing arm 72 swings obliquely across the reference plane at a side opposite to the opposite phase state, and the control rod 66 is deviated to the left in FIG. 2 upon clockwise steering operation of the steering wheel 24. When the control rod 66 is deviated to the left, the rear wheels RL and RR are turned to the right, as will be described later. In other words, in this in-phase state, the rear wheels RL and RR are turned in the same direction as the turning direction of the front wheels FL and FR.

In order to change an inclination angle of the support pin 70 with respect to the moving axis, i.e., an inclination angle of the holder 68 with respect to the reference plane, a sector gear 92 as a worm wheel is integrally attached to the support shaft 74 of the holder 68. The sector gear 92 is meshed with a worm gear 96 which is rotated together with a rotational shaft 94. A bevel gear 98 is integrally attached to the rotational shaft 94. The bevel gear 98 is meshed with a bevel gear 102 which is mounted coaxially with an output shaft 100a of a stepping motor 100 as a control motor.

In this manner, when the stepping motor 100 is operated, the sector gear 92 is pivoted, and the inclination angle of the holder 68 with respect to the reference plane is changed. In other words, the in-phase, opposite phase, and neutral states of the turning angle $\theta R$ of the rear wheels RL and RR with respect to the front wheels FL and FR are changed and controlled in accordance with the rotational amount of the stepping motor 100.

The neutral position is defined at a position where the central line of the sector gear 92 is perpendicular to the central line of the rotational shaft 94. When the sector gear 92 is pivoted clockwise when viewed from above the vehicle body, the rear wheel turning angle ratio is controlled in the opposite phase state wherein the rear wheels RL and RR are directed in a direction opposite to the front wheels FL and FR. On the other hand, when the sector gear 92 is pivoted counterclockwise, the rear wheel turning angle ratio can be controlled in the in-phase state wherein the rear wheels RL and RR are directed in the same direction as that of the front wheels FL and FR.

Stopper members 104 and 106 on opposite phase and in-phase sides are mounted on a casing (not shown) of the turning angle ratio control mechanism 64 at two, i.e., left and right sides of the sector gear 92. The stopper members 104 and 106 comprise pins for regulating a pivot range of the sector gear 92. In this manner, when the pivot angle from the neutral position reaches $-17.5$ degrees, the sector gear 92 abuts against the opposite-phase side stopper member 104, and its pivotal movement is regulated.

Upon pivotal movement of the sector gear 92 to the in-phase side, when the pivot angle from the neutral position becomes 20 degrees, the sector gear 92 abuts against the in-phase side stopper 106, and its movement is regulated. The control position of the stepping motor 100 is regulated so that the sector gear 92 is located at an opposite phase side position in an initial state.

Note that in order to regulate a maximum moving range of the relay rod 38 in the rear wheel steering apparatus 10, rod stoppers 108 are arranged at both the sides of the coupling member 56.

As shown in FIG. 1, an oil filter 110 is interposed midway along the oil supply pipe 50. A fail-safe oil branch pipe 112 branches from the oil filter 110 in addition to the oil supply pipe 50. The distal end portion of the oil branch pipe 112 is forked, and two distal ends 112a and 112b are respectively connected to input ports of fail-safe solenoid valves 114 and 116. The output ports of the pair of solenoid valves 114 and 116 are respectively connected to return oil branch pipes 118a and 118b. These return oil branch pipes 118a and 118b are combined into one return oil pipe 118, and the pipe 118 is connected to the reservoir tank 48.

Upon an ON operation of an ignition key of the vehicle, the solenoid valves 114 and 116 are energized to close the corresponding oil branch pipes 112a and 112b, and are deenergized to open the pipes 112a and 112b. As a result, only when the solenoid valves 114 and 116 are closed, an oil pressure from the hydraulic pump 54 acts on the control valve 46. If a failure is detected during the rear wheel steering operation, as will be described later, an energization to the solenoid valves 114 and 116 is cut off by a control unit 132 (to be described later), thus executing a fail-safe operation.

As a result, one of the solenoid valves 114 and 116 is opened, so that the oil pressure from the hydraulic pump 54 is released to the reservoir tank 48 without acting on the control valve 46. Therefore, no oil pressure acts on the power cylinder 40, and the relay rod 38 is pressed by the pair of return springs 40d from two sides, and is mechanically biased to the neutral position. That is, a fail-safe function is effected, and the rear wheels are fixed at the neutral position, that is, the vehicle is mechanically fixed in a two-wheel steering (2WS) state.

As described above, the rear wheel turning angle ratio is defined by the pivot position of the sector gear 92. A turning angle ratio sensor 120 is attached to the sector gear 92 so as to detect the pivot angle of the gear 92, thus detecting the preset rear wheel turning angle ratio. Note that the turning angle ratio sensor outputs a zero value at the neutral position, outputs a positive value in the in-phase state, and outputs a negative value in the opposite phase state.

Figure 3:
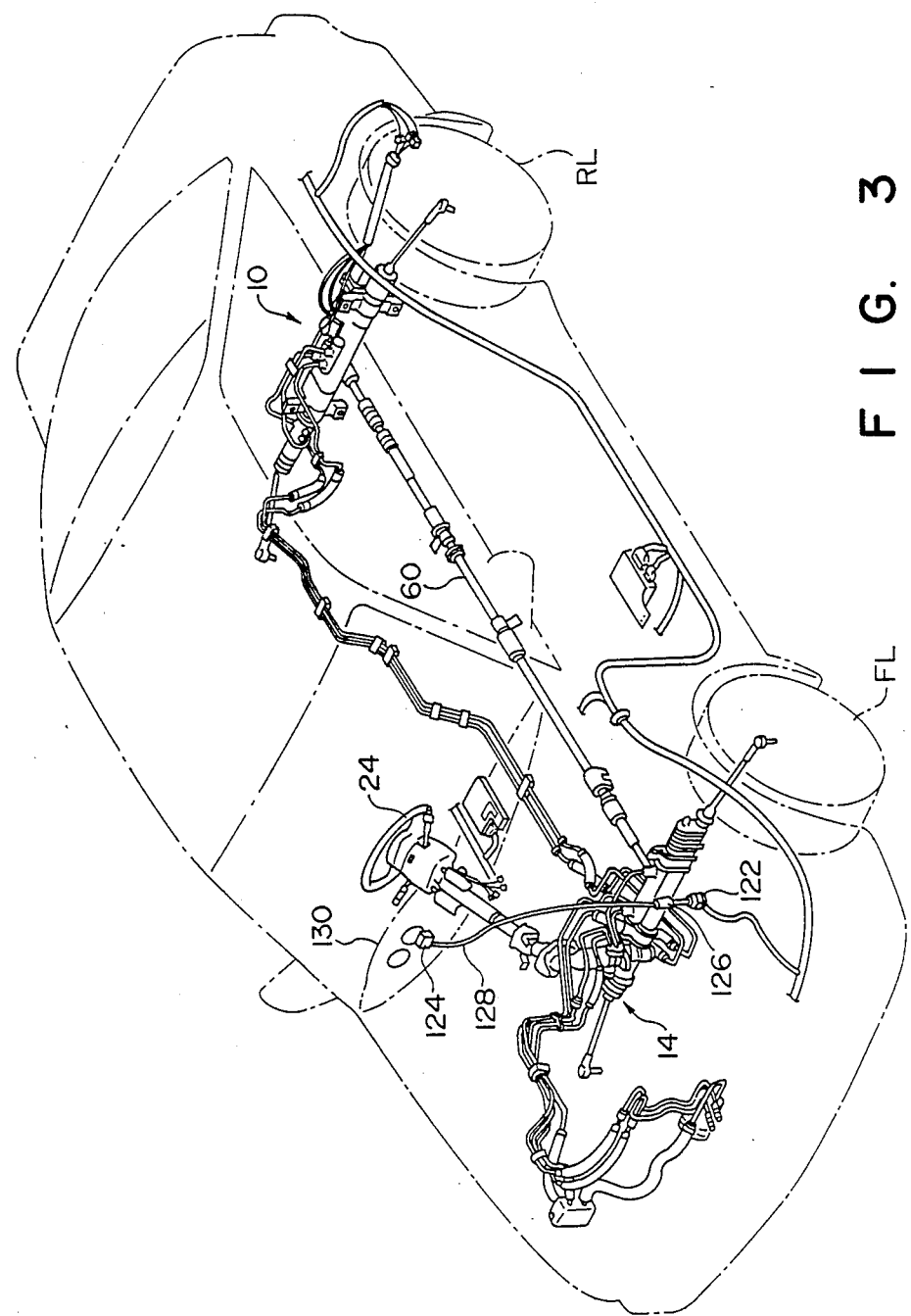
FIG. 3 is a perspective view showing a setting state of first and second vehicle speed sensors.

As shown in FIG. 3, in this embodiment, in order to achieve the vehicle-speed sensitive four-wheel steering system, two, i.e., first and second vehicle speed sensors 122 and 124 are arranged. The first vehicle speed sensor 122 is connected to a coupling portion of a speedometer shaft 128 to a transaxle 126, and the second vehicle speed sensor 124 is arranged in a speedometer 130. The vehicle speed sensors 122 and 124 are of lead switch type, and output a four-pulse output signal per revolution of the speedometer shaft 128.

The stepping motor 100 serves as a turning angle ratio changing means, and its operation is controlled by an output from a control unit 132 incorporating a microcomputer, as shown in FIG. 1. The control unit 132 executes a fail-safe operation when a predetermined failure occurs in the 4WS state, and fixes the rear wheel turning angle ratio to a value which is different from a preset normal characteristic and is determined according to a vehicle speed before lock detection in a wheel lock detection state (to be described in detail later).

The control unit 132 receives a power supply voltage from a battery (indicated by +B in FIG. 4) through a relay/timer circuit 134, as shown in FIG. 4. The first and second solenoid valves 114 and 116 and the stepping motor 100 also receive the power supply voltage from the battery through the relay/timer circuit 134. The voltage from the relay/timer circuit 134 is supplied to the control unit 132 through an oil level switch 136 (to be described later).

The relay/timer circuit 134 is connected to an ignition switch (indicated by IG in FIG. 4). Upon an OFF operation of the ignition switch, the relay/timer circuit 134 cuts off the power source voltage from the battery to respective components connected thereto after a predetermined period of time has passed. The relay/timer circuit 134 is connected to an L terminal of an alternator 138 for detecting a failure, as will be described later. When an input voltage at the L terminal is equal to or lower than a predetermined voltage, the control unit 132 disables the relay to stop supply of a voltage to the respective components, thereby interrupting 4WS control.

Note that the control unit 132 detects a voltage generated by the alternator 138. When the detected voltage exceeds a predetermined voltage, a drive state at a predetermined engine speed is detected.

When an ignition voltage input upon ON operation of the ignition switch is not equal to or higher than 9 V, the relay/timer circuit 134 outputs a failure signal to the control unit 132.

As shown in FIG. 4, the control unit 132 is connected to the first and second vehicle speed sensors 122 and 124, a brake sensor 140 which is turned on when a brake pedal is depressed, and an inhibitor switch 142 attached to a selector lever.

The control unit 132 executes the following failure detection as well as the above-mentioned two types of failure detection based on outputs from the sensors connected thereto. More specifically, the failure signal is output to the control unit 132 when the first and second vehicle speed sensors 122 and 124 output vehicle speed quick change signals, when outputs therefrom are different from each other, when the outputs become zero during travel, when the calculated value of the pivot angle of the sector gear 92 upon operation of the stepping motor 100 is different from the output value from the turning angle ratio sensor 120, when an output circuit of the solenoid valves 114 and 116 malfunctions, is disconnected or is short-circuited, when an output circuit of the stepping motor 100 malfunctions, is disconnected, or short-circuited, when the output from the turning angle ratio sensor 120 falls outside a setting range, when the reference output signal from the turning angle ratio sensor 120 cannot be fetched, and when the oil level switch 136 in the tank of the hydraulic pump is turned on.

Note that the control unit 132 receives the above-mentioned failure signal, and executes one of three types of fail-safe operations according to the content of the failure, that is, such that the stepping motor 100 is driven to forcibly set a 2WS mode, that energization to the solenoid valves 114 and 116 is cut off so that no oil pressure acts on the control valve 46 and the control valve 46 is mechanically fixed by the biasing forces of the pair of springs 40d, or that a voltage supply to the rear wheel steering apparatus 10 is cut off to interrupt the control operation.

In this embodiment, when the engine speed is equal to or higher than 2,200 r.p.m. and when an OFF signal is output from the inhibitor switch 142, that is, the selector lever is brought to a travel setting position other than an N (neutral) range or a P (parking) range, a travel state is determined. In this state, the control unit 132 is set so that when no vehicle speed data is output from the first and second vehicle speed sensors 122 and 124, an abnormality of the vehicle speed sensors is determined as described above, and the failure detection is executed.

The failure detection operation itself is not a wrong control content. However, if the failure detection operation is always executed to induce a fail-safe operation, drawbacks are caused in the following cases. For this reason, in this embodiment, the failure detection operation based on the abnormality of the vehicle speed sensor described above is inhibited.

More specifically, upon an inspection of a vehicle in an auto repair shop, in order to inspect whether or not an engine output can be regularly obtained, a test is performed, wherein an acceleration pedal is depressed to increase an engine speed while the brake pedal is depressed to forcibly stop the vehicle. In this test, if an engine is normal, the engine speed is increased to a value exhibiting a maximum torque. In this test, if a failure detection is not restricted, the above-mentioned failure detection is executed since no vehicle speed data is obtained from the vehicle speed sensors 122 and 124 although the travel state is detected.

However, in this embodiment, when the brake pedal is depressed to turn on the brake switch 140, it is defined that the above-mentioned failure state is caused by the test, and in this case, inhibition control for restricting failure detection is executed.

In this embodiment, an unnecessary failure detection operation is inhibited in the test of the vehicle by utilizing the brake switch, thus improving workability of a test operation.

In a normal travel state, the control unit 132 has a rear wheel turning angle ratio according to the present travel state, i.e., the detected vehicle speed in accordance with a normal first turning angle ratio characteristic indicated by a solid curve I in FIG. 5. In this control unit 132, the stepping motor 100 is driven and controlled so as to turn the rear wheels RL and RR based on the rear wheel turning angle ratio determined according to a higher one of the two vehicle speeds detected by the transaxle side first vehicle speed sensor 122 and the speedometer side second vehicle speed sensor 124.

The vehicle speed detection is executed by calculating a moving average from the latest six vehicle speed data sampled at 131-msec intervals by the vehicle speed sensors 122 and 124.

In the control unit 132, a lock control operation when the wheels are locked during travel of the vehicle is executed as separate control independently of the above-mentioned fail-safe operation.

As discussed in detail in the prior art, in this embodiment, when a vehicle travels along a curved road at a speed higher than a predetermined vehicle speed (35 km/h), since the front and rear wheels are turned in the in-phase state, a so-called high-speed cornering characteristic can be maintained well. If a driver finds an obstacle ahead during the high-speed cornering, he quickly depresses a brake pedal. When the wheels are locked by the quick braking, although an actual speed of the vehicle is not quickly decreased, the vehicle speed data output from the first and second vehicle speed sensors 122 and 124 become zero. For this reason, the detected vehicle speeds become lower than the predetermined vehicle speed, and the front and rear wheels are turned in the opposite phase state.

That is, during cornering, the rear wheels are turned from the in-phase state to the opposite phase state. For this reason, although the front and rear wheels must firmly grip the road surface in the in-phase state in order to assure stable travel while keeping the vehicle position during cornering, the rear wheels are turned to the opposite phase state to generate a yaw rate, and accidental turning tendency of the vehicle is quickly enhanced. As a result, a so-called tuck-in phenomenon occurs, and the vehicle may cause a spin, resulting in a dangerous state.

In order to evade such danger, in this embodiment, when the control unit 132 detects the lock state of the wheels, danger evasion control for setting a rear wheel turning angle ratio at a stable side (to be referred to as lock control hereinafter) is executed.

The control unit 132 executes lock detection as follows. That is, the control unit 132 determines that the wheels are locked:

(1) when the brake pedal is depressed and the brake sensor 140 is turned on;

(2) when the detection result of the vehicle speed from the first vehicle speed becomes substantially zero; and (3) when the detected vehicle speed quickly before substantial zero determination of the vehicle speed is made from the detection result of the first vehicle speed sensor is 30 km/h.

The detection content of the first vehicle speed sensor 122 in the above condition (2) is set to be "substantially zero" since the existing lead switch type vehicle speed sensor has poor detection accuracy and makes zero determination within a detected vehicle speed range of about 10 km/h to zero.

In the condition (3), the detected vehicle speed immediately before substantial zero determination of the vehicle speed is made is defined by the average value of the six detection results immediately before the last sampling time of the six detection results used when the substantial zero determination of the vehicle speed is made, i.e., 131 msec before.

When the three conditions are satisfied, lock determination is made, and the control unit executes the following lock control based on this lock determination.

In this lock control, in order to maintain a stable travel state, a fixing operation for fixing the rear wheel turning angle ratio to a value at an instance when the vehicle speed immediately before lock determination is detected is executed. More specifically, as indicated by a broken curve II in FIG. 5, when the vehicle is quickly braked at a vehicle speed of 35 km/h or higher and the wheels are locked, even though the vehicle speed detected by the first vehicle speed sensor 122 is substantially zero, the following rear wheel turning angle ratio is kept unchanged in the in-phase state when the detection is made. With this fixing operation of the rear wheel turning angle ratio, the rear wheel turning angle ratio is held in a stable side, and the rear wheels can no longer be turned. In this embodiment, travel property when the wheels are locked can be safely assured.

As can be understood from the above discussion, when the vehicle speed immediately before the lock state is equal to or higher than 30 km/h and is lower than 35 km/h, the rear wheel turning angle ratio is kept unchanged in the opposite phase state. However, since the rear wheel turning angle ratio when the vehicle speed is equal to or higher than 30 km/h and is lower than 35 km/h is almost zero, if this rear wheel turning angle ratio is kept unchanged, no problem is posed.

As described above, in the normal rear wheel steering control or failure detection, the first and second vehicle speed sensors 122 and 124 are used as detection means. As a vehicle speed detection means in the lock detection operation, only the transaxle side first vehicle speed sensor 122 is used, and the speedometer side second vehicle speed sensor 124 is not used. The first and second vehicle speed sensors 122 and 124 are coupled to each other through the speedometer shaft 128. Since the speedometer shaft 128 is rigid but long, a change in rotation of a driven gear at the transaxle cannot be accurately and quickly transmitted to the far second vehicle speed sensor 124 due to a variation in a twist direction or an inertia upon transmission of rotation.

In this embodiment, in the normal rear wheel steering control or in the failure detection, the two vehicle speed sensors 122 and 124 are used. However, in the lock detection operation, only one vehicle speed sensor, in particular, the transaxle side first vehicle speed sensor 122 is used. In this manner, in the lock detection operation, a vehicle speed can be detected in a short response time.

In this embodiment, a comparison operation is not executed such that after the values of the two vehicle speed sensors are compared, a higher detection value is employed. For this reason, a detection operation time becomes very short, and the short response time can be assured.

In this embodiment, as the failure control content described above is separately executed from the vehicle speed detection operation in the lock detection operation, a coincidence/noncoincidence of the output values from the first and second vehicle speed sensors 122 and 124 is detected. As long as both the output values coincide with each other, failure detection is not made, and the first vehicle speed sensor 122 is employed as the vehicle speed detection means.

However, if the output from the first vehicle speed sensor 122 is quickly changed and becomes zero for any cause and if only an output from the second vehicle speed sensor 124 is obtained, lock determination is not made using the detection result from the second vehicle speed sensor 124 and the failure detection is made based on the noncoincidence between the detection outputs from the vehicle speed sensors 122 and 124, thus executing the above-mentioned fail-safe operation.

More specifically, in the fail-safe operation in this case, energization to the first and second solenoid valves 114 and 116 is cut off, and the hydraulic circuit is disconnected. Upon disconnection of the hydraulic circuit, the rear wheels RL and RR are not turned but are fixed in the so-called 2WS state by the biasing force of the pair of coil springs 40d even when the front wheels FL and FR are turned. A fail warning lamp 144 arranged in a meter panel shown in FIG. 4 flashes once. In this manner, the fail-safe operation is executed.

In the control unit 132, failure detection based on a malfunction of the first vehicle speed sensor 122 described above is not executed when the brake pedal is depressed to turn on the brake switch 140, and the lock control described above is executed. The failure detection based on the fact that the output from the first vehicle speed sensor 122 is quickly changed and becomes zero is executed only when the brake switch 140 is kept OFF.

Of the three conditions of lock determination described above, a state wherein the vehicle speed detected by the first vehicle speed sensor 122 is quickly changed and substantially becomes zero and a state wherein the first vehicle speed sensor 122 malfunctions and immediately stops outputting data in the condition (2) appear as an identical state. For this reason, in this embodiment, data corresponding to a zero output from the first vehicle speed sensor 122 when the brake switch 140 is turned on is used for lock determination, and data corresponding to a zero output from the first vehicle speed sensor 122 when the brake switch 140 is kept OFF is used for failure detection.

In this embodiment, when the wheels are locked by the braking operation during travel, even if the output from the first vehicle speed sensor 122 becomes zero, since this zero state is based on the lock state of the wheels, no failure detection is made and the lock detection operation is reliably executed.

As a result, the drawback caused when the failure detection is performed when the output from the first vehicle speed sensor 122 becomes zero and the steering state is forcibly fixed to the 2WS state, that is, the drawback that when the wheels are locked by quick braking during travel at a vehicle speed of 35 km/h or higher, the operation for forcibly fixing the 2WS mode is executed based on the fail-safe control although the rear wheels are fixed at the turning angle ratio for the in-phase state and the stable travel state must be maintained, and the rear wheels RL and RR are turned from the in-phase positions to the neutral position, can be reliably prevented.

In this embodiment, the fact that the output from the first vehicle speed sensor 122 becomes zero while the brake switch 140 is kept OFF during travel means that the stop state is detected by the first vehicle speed sensor 122. Therefore, in this state, an abnormal state such as a malfunction of the first vehicle speed sensor 122 is detected, and the above-mentioned failure detection is executed.

In the control unit 132, the following limitation about the lock detection is imposed. That is, in the above-mentioned lock detection operation, when the vehicle speed detection result from the first vehicle speed sensor 122 accompanies a quick increase in vehicle speed over a predetermined value, lock detection is not executed, and the rear wheels RL and RR are steered in accordance with the first turning angle ratio characteristic indicated by the solid curve I in FIG. 5.

More specifically, the control unit 132 detects a change in vehicle speed detection result per second from the first vehicle speed sensor 122. If it is determined that the change in vehicle speed per second exceeds a predetermined value (40 km/h), i.e., the vehicle speed is quickly increased, even if the lock detection state occurs immediately thereafter, in other words, the above-mentioned lock determination conditions are satisfied, no lock detection is performed, and shift to lock control is inhibited. In the lock control inhibition state, the rear wheels RL and RR are steered in accordance with the first turning angle ratio characteristic described above.

In the control unit 132, since the limitation is imposed on lock detection, when a road surface has a low friction coefficient, in other words, when the road surface is frozen, safe travel property of the vehicle can be assured when the acceleration pedal is depressed strongly upon starting and a so-called wheel spin state occurs.

More specifically, when the wheel spin state occurs upon starting of the vehicle, control of the vehicle is lost and the vehicle may be turned sideways. In this case, a driver quickly depresses the brake pedal while turning the steering wheel 24 in order to correct the vehicle position. If the wheels are locked in this state, the above-mentioned three lock determination conditions are satisfied. However, in this embodiment, as described above, lock detection immediately after determination of a quick increase in vehicle speed is inhibited. Therefore, a drawback that when the lock detection is executed, the rear wheel turning angle ratio immediately before lock detection is kept unchanged and a normal rear wheel turning angle ratio cannot be recovered upon restarting, can be reliably prevented.

In this embodiment, since the limitation is imposed on the lock detection, a drawback caused when chattering in the vehicle speed sensor occurs and only the detection output indicates a quick increase in vehicle speed although an actual vehicle speed is left unchanged, can be reliably prevented.

If the above-mentioned limitation is not imposed, chattering such as engine vibration occurs in a stop state, and thereafter, when a vehicle speed zero state is detected, the control unit 132 detects the lock state of the wheels, and executes a fixing operation of the rear wheel turning angle ratio. However, chattering always occurs with a quick increase in vehicle speed. In this embodiment, since the lock detection operation is inhibited upon detection of the quick increase in vehicle speed, an unnecessary fixing operation of the rear wheel turning angle ratio based on the erroneous operation of the vehicle speed sensor caused by chattering can be prevented. Thus, normal turning angle ratio control based on the first turning angle ratio characteristic is executed, and good travel property can be assured.

In the above description, the lock detection operation, the lock control operation, and various control operations therefor in the control unit 132 have been described.

However, when lock control is executed based on lock detection, the rear wheel turning angle ratio is fixed to a ratio according to the vehicle speed immediately before lock detection, as described above. Such an operation is necessary in view of assurance of safe travel state. However, after the lock state of the wheels is released, it is unnecessary. Therefore, after the lock state of the wheels is released, the lock control operation is canceled as soon as possible to release a state wherein the rear wheel turning angle ratio is fixed, and normal turning angle ratio control must be executed. For this purpose, in this embodiment, the cancel operation of the lock control operation, in other words, a recover operation from the lock control state to the normal turning angle ratio control operation is performed, as will be described later.

The recover operation (lock cancel operation) will now be described.

The recover operation is basically executed when it is determined that it is safe if the lock control operation is canceled after the lock detection operation. The control unit 132 includes a first mode wherein the cancel operation is executed when an actual vehicle speed coincides with the vehicle speed detected by the first vehicle speed sensor 122, and a second mode wherein the cancel operation is executed when the detected vehicle speed is lower than the actual vehicle speed.

In the first mode, when the actual vehicle speed substantially coincides with the vehicle speed detected by the first vehicle speed sensor 122 after the lock detection operation, this means that the wheels perfectly grip the road surface. Therefore, it is determined that a dangerous state which might cause a slip has been terminated. A substantial coincidence between the actual vehicle speed and the vehicle speed detected by the first vehicle speed sensor 122 is determined when one of the following three conditions is satisfied.

The first condition is that a time period wherein the locked vehicle can be reliably stopped under any condition (travel condition, road surface condition) passes. After the time period has passed, a vehicle speed zero state (stop state) is established, and as described above, after the lock detection operation, the actual vehicle speed substantially coincides with the vehicle speed detected by the first vehicle speed sensor 122. Therefore, at this timing, the lock control operation is canceled. In this manner, the normal turning angle ratio control operation as indicated by the solid curve I in FIG. 5 is recovered.

More specifically, a cancel period T1 from when the lock control operation is started after the above-mentioned three conditions are satisfied and the lock detection is performed until the lock control operation is canceled is defined as follows when the vehicle travels at x km/h immediately before wheel lock:

Cancel Period T1 (sec) = x·C where C : constant

In this embodiment, the constant C is 0.142. The value "0.142" is calculated from 17 sec corresponding to a time period required to stop a vehicle when the vehicle which travels along a road having a friction coefficient of 0.2 at 120 km/h is quickly braked and keeps traveling along the road while the wheels are locked. Note that the friction coefficient of 0.2 is experienced in a frozen road surface state during mid-winter in North European countries, and is sufficient as a setting condition.

Figure 6A:
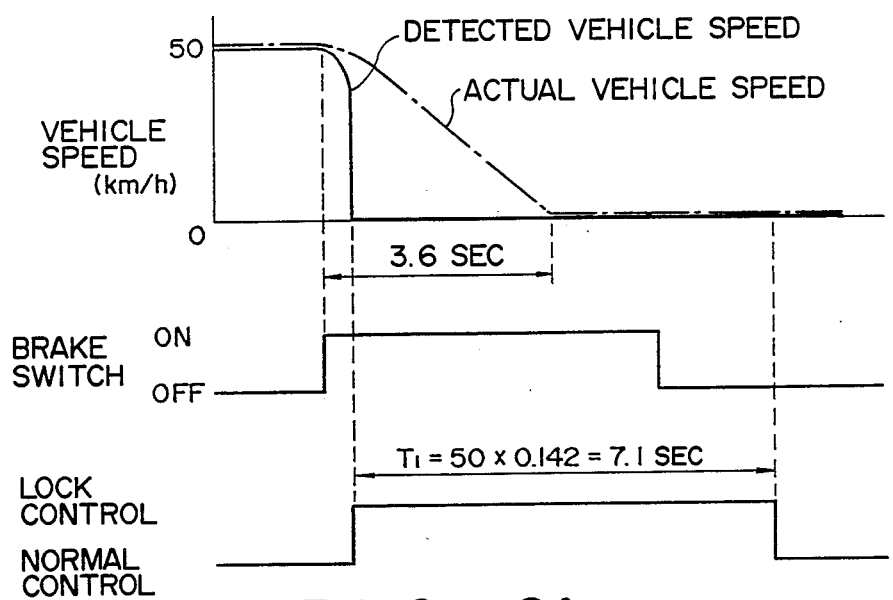
FIGS. 6A to 6D are timing charts for explaining four cancel conditions of lock control.

In this manner, as shown in FIG. 6A, even when the vehicle traveling at 60 km/h is quickly braked and the wheels are locked, the cancel period T1 is:

50×0.142=7.1 (sec)

Therefore, the vehicle can be stopped after 7.1 sec.

Note that in FIG. 6A, a solid curve indicates the vehicle speed detected by the first vehicle speed sensor 122, and an alternate long and short dashed curve indicates an actual vehicle speed. As can be apparent from the alternate long and short dashed curve in FIG. 6A, the vehicle is stopped 3.6 sec after the wheels were locked in this embodiment. This setting also applies to FIGS. 6B to 6D.

Since the first condition is set in this manner, after the lapse of the cancel period T1, even if the driver continuously depresses the brake pedal and the brake switch 140 is kept ON, the vehicle is surely stopped. For this reason, after the lapse of the cancel period T1, lock control is canceled, and the normal turning angle ratio control operation is executed, thus posing no problem.

In this embodiment, when the driver notices the stop state of the vehicle and intends to restart the vehicle, the rear wheel turning angle ratio is not fixed to a ratio immediately before the lock state, and the normal turning angle ratio control can be executed. Thus, good travel property of the vehicle can be maintained.

A second condition for canceling the lock control operation will be described below. The second condition is that the currently detected vehicle speed exceeds a vehicle speed immediately before lock detection. When the second condition is satisfied, the actual vehicle speed substantially coincides with the vehicle speed detected by the first vehicle speed sensor at the vehicle speed immediately before lock detection. Therefore, at this timing, the lock control operation is canceled. In this manner, the normal turning angle ratio control operation as indicated by the solid curve I in FIG. 5 can be recovered.

Figure 6B:
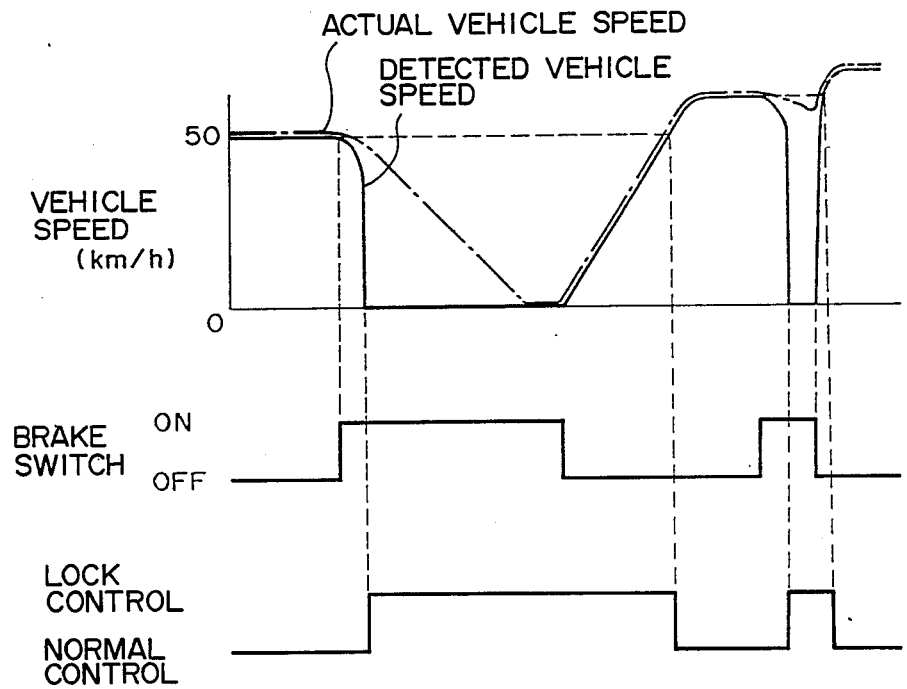

More specifically, as shown in FIG. 6B, while the vehicle travels at 50 km/h, when the brake pedal is quickly depressed and the wheels are locked, the lock state is detected, and the lock control operation is started. In this case, the driver notices that the vehicle is completely stopped, releases the brake pedal, and depresses the acceleration pedal to accelerate the vehicle. In this case, since the wheels grip the road surface, the output from the vehicle speed sensor 122 is increased in accordance with depression of the acceleration pedal, as indicated by a solid curve in FIG. 6B. When the detected vehicle speed exceeds the vehicle speed immediately before lock detection, unless the rear wheel turning angle ratio is changed to the in-phase side, travel stability of the vehicle cannot be assured. For this reason, the lock control operation is canceled, and the rear wheels are steered at the rear wheel turning angle ratio according to the present vehicle speed in view of safe travel.

Under the second condition, the driver may release the brake pedal relatively earlier after the wheels were locked, i.e., before the actual vehicle speed is not so decreased, and may depress the acceleration pedal. In this case, when the wheels grip the road surface, the output from the vehicle speed sensor 122 is increased according to depression of the acceleration pedal, as indicated by the solid curve in FIG. 6B. When the currently detected vehicle speed exceeds the vehicle speed immediately before lock detection, unless the rear wheel turning angle ratio is changed to the in-phase side, travel stability of the vehicle cannot be assured, as described above. For this reason, the lock control operation is canceled, and the rear wheels are steered at the rear wheel turning angle ratio according to the present vehicle speed in view of safe travel.

In this embodiment, when the vehicle is accelerated after lock detection, when the currently detected vehicle speed coincides with and exceeds the vehicle speed immediately before lock detection, the lock control operation is canceled, and the normal turning angle ratio control operation is started, thus assuring safe travel.

A third condition for canceling the lock control operation will now be described. The third condition is that a constant vehicle speed is continuously input for a predetermined period T2 regardless of the ON/OFF state of the brake switch. That is, after lock detection, when vehicle speed data is input from the first vehicle speed sensor 122 for the predetermined period T2, the lock control operation is canceled. In this manner, the normal turning angle ratio control operation as indicated by the solid curve I in FIG. 5 is recovered.

Figure 6C:
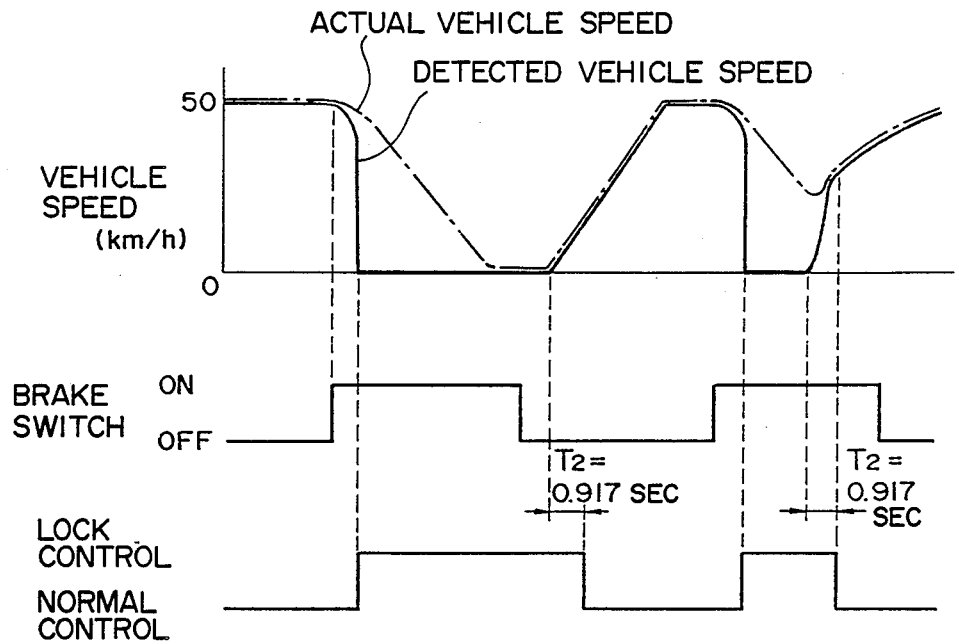

More specifically, as shown in the left half in FIG. 6C, while the vehicle travels at 50 km/h when the brake pedal is quickly depressed and the wheels are locked, the lock detection is performed, and the lock control operation is started. A driver may notice that the vehicle is completely stopped, release the brake pedal, and depress the acceleration pedal to start the vehicle. In this case, since the wheels grip the road surface, the output from the first vehicle speed sensor 122 is increased according to depression of the acceleration pedal, as shown in FIG. 6C. When the vehicle speed is continuously output from the vehicle speed sensor 122 for 917 msec set as the predetermined period T2, since the wheels grip the road surface, unless the rear wheel turning angle ratio is changed according to normal turning angle ratio control corresponding to the detected vehicle speed, travel stability of the vehicle cannot be assured. For this reason, the lock control operation is canceled, and the rear wheels are steered at the rear wheel turning angle ratio according to the present vehicle speed in view of safe travel.

Under the third condition, as shown in the right half in FIG. 6C, a driver may decrease a depression amount of the brake pedal relatively early, in other words, before the actual vehicle speed is not so decreased, so that the wheels grip the road surface. In this case, since the driver does not release the brake pedal, the brake switch 140 is kept ON. However, when the wheels grip the road surface, the output from the first vehicle speed sensor 122 is recovered, as indicated by the solid curve in FIG. 6C. As described above, when 917 msec have passed after the vehicle speed data was output from the first vehicle speed sensor 122, unless the rear wheel turning angle ratio is changed according to the detected vehicle speed, travel stability of the vehicle cannot be maintained. For this reason, in view of safe travel, the lock control operation is canceled, and the rear wheels are steered at a rear wheel turning angle ratio according to the present vehicle speed.

In this embodiment, when vehicle speed data is output for the predetermined period T2 after lock detection, it is determined that the wheels grip the road surface and the detected vehicle speed coincides with the actual vehicle speed. In the state wherein the wheels grip the road surface, lock control is quickly canceled regardless of the ON/OFF state of the brake switch, and the normal turning angle ratio control is started, thus assuring travel safety.

In the first to third conditions, as has been described above, when the detected vehicle speed coincides with the actual vehicle speed, this means that the wheels grip the road surface. Therefore, the lock control operation need not be performed, and is canceled to recover the normal turning angle ratio control operation.

However, a fourth condition is set at a timing at which it can be determined that if the lock control operation is canceled, sufficient safety can be guaranteed before the detected vehicle speed coincides with the actual vehicle speed. More specifically, the fourth condition is established when the predetermined period T2 has passed after the brake switch 140 is turned off. When the fourth condition is satisfied, the wheels are about to grip the road surface after braking is released, and a vehicle speed detected by the first vehicle speed sensor 122 will coincide with the actual vehicle speed soon. At this timing, the lock control operation is canceled, and the normal turning angle ratio control operation indicated by the solid curve I in FIG. 5 is recovered.

Figure 6D:
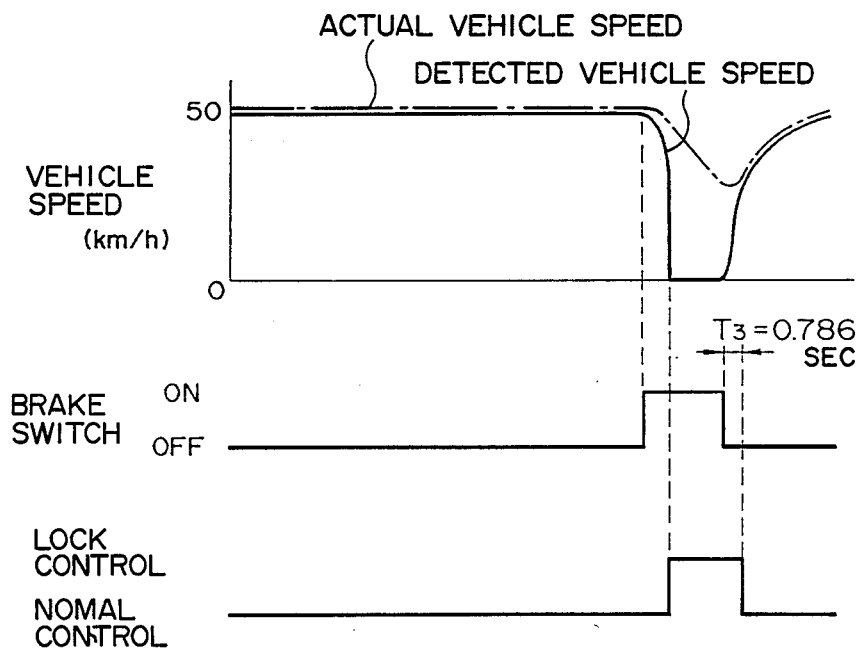

More specifically, as shown in the right half in FIG. 6D, while the vehicle travels at 50 km/h, a driver erroneously performs quick braking, and the wheels are temporarily locked. In this lock state, when the driver notices that the wheels are locked, he releases the brake pedal, and the wheels are about to grip the road surface In this case, when the driver releases the brake pedal, the brake switch 140 is turned off. When the predetermined period T2 (in this embodiment, 786 msec) has passed after the brake switch 140 was turned off, the lock control operation is released, and the normal turning angle ratio control operation is recovered.

The predetermined period "786 msec" is determined in the fourth condition such that since the sampling time corresponds to 131 msec, the control content is recovered from the lock control to the normal turning angle ratio control after six vehicle speed data are input. As described above, the vehicle speed is calculated by taking a moving average of six vehicle speed data. The fourth condition is satisfied when 786 msec have passed for which six vehicle speed data necessary for taking a moving average are output after the lock state of the wheels is released by releasing braking and the first vehicle speed sensor 122 restarts outputting the vehicle speed data.

A detected vehicle speed when 786 msec have passed after braking was released is an average value of the latest six vehicle speed data. In practice, if a vehicle speed at this time coincides with the actual vehicle speed, the detected vehicle speed does not coincide with the actual vehicle speed. However, as described above, the above-mentioned behavior of the vehicle is erroneously caused by excessive depression of the brake pedal by the driver. Therefore, unlike the above-mentioned three conditions, the vehicle travels relatively stably. In this manner, unlike the above three conditions, before the actual vehicle speed coincides with the detected vehicle speed, the normal turning angle ratio control can be recovered without causing a problem.

In other words, in the fourth condition, before the detected vehicle speed coincides with the actual vehicle speed, lock control is positively canceled, and the normal turning angle ratio control operation is recovered. For this reason, the detected vehicle speed when the normal control is recovered is lower than to the actual vehicle speed. In order to change the rear wheel turning angle ratio, the stepping motor 100 is driven upon an instruction from the control unit 132 so as to attain the rear wheel turning angle ratio according to the detected vehicle speed data. The operation speed of the stepping motor 100 is set to be changed in accordance with the operation range, in other words, a change in detected vehicle speed.

If the vehicle speed data is actually input to the control unit 132 when the normal turning angle ratio control is recovered and the control unit 132 drives the stepping motor 100 based on this data, since the latest vehicle speed data is zero, the unit 132 operates the stepping motor 100 in a short operation time in order to compensate for this difference. In this manner, the rear wheels RL and RR are quickly turned, and in the worst case, the tuck-in phenomenon described above may occur.

However, in this embodiment, when the normal turning angle ratio control is recovered, vehicle speed data based on the actual vehicle speed is not input to the control unit 132, and an average value of six vehicle speed data including zero data is employed as detected vehicle speed data. As a result, the detected vehicle speed is always lower than the actual vehicle speed. Immediately after the normal control is recovered, since the stepping motor 100 is driven based on the detected vehicle speed lower than the actual vehicle speed, the rear wheels RL and RR are relatively slowly turned, and the above-mentioned problem will not be posed.

The detected vehicle speed gradually approaches the actual vehicle speed as the sampling time of 131 msec has passed. As a result, the stepping motor 100 can be operated to follow a change in vehicle speed data, and is not overloaded, thus achieving a good operation state.

The description of the cancel operation of the lock control operation, that is, the resuming operation from the lock control state to the normal turning angle ratio control operation is ended, and a control procedure of a series of lock control operations in the control unit 132 will be schematically described below with reference to the flow charts shown in FIGS. 7A to 7C.

Figure 7A:
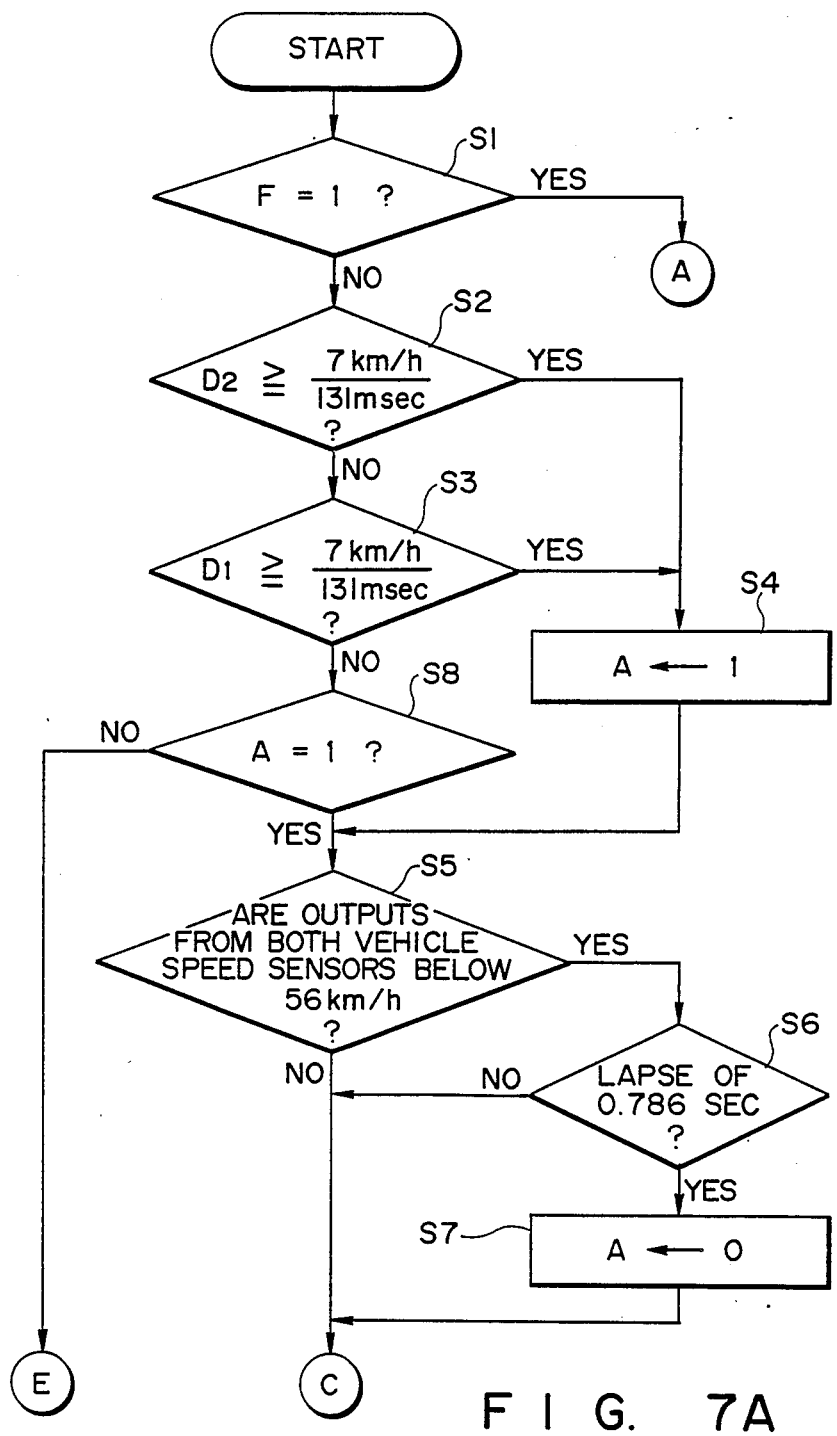
FIGS. 7A to 7C are flow charts schematically showing a control procedure of the control unit.
Figure 7B:
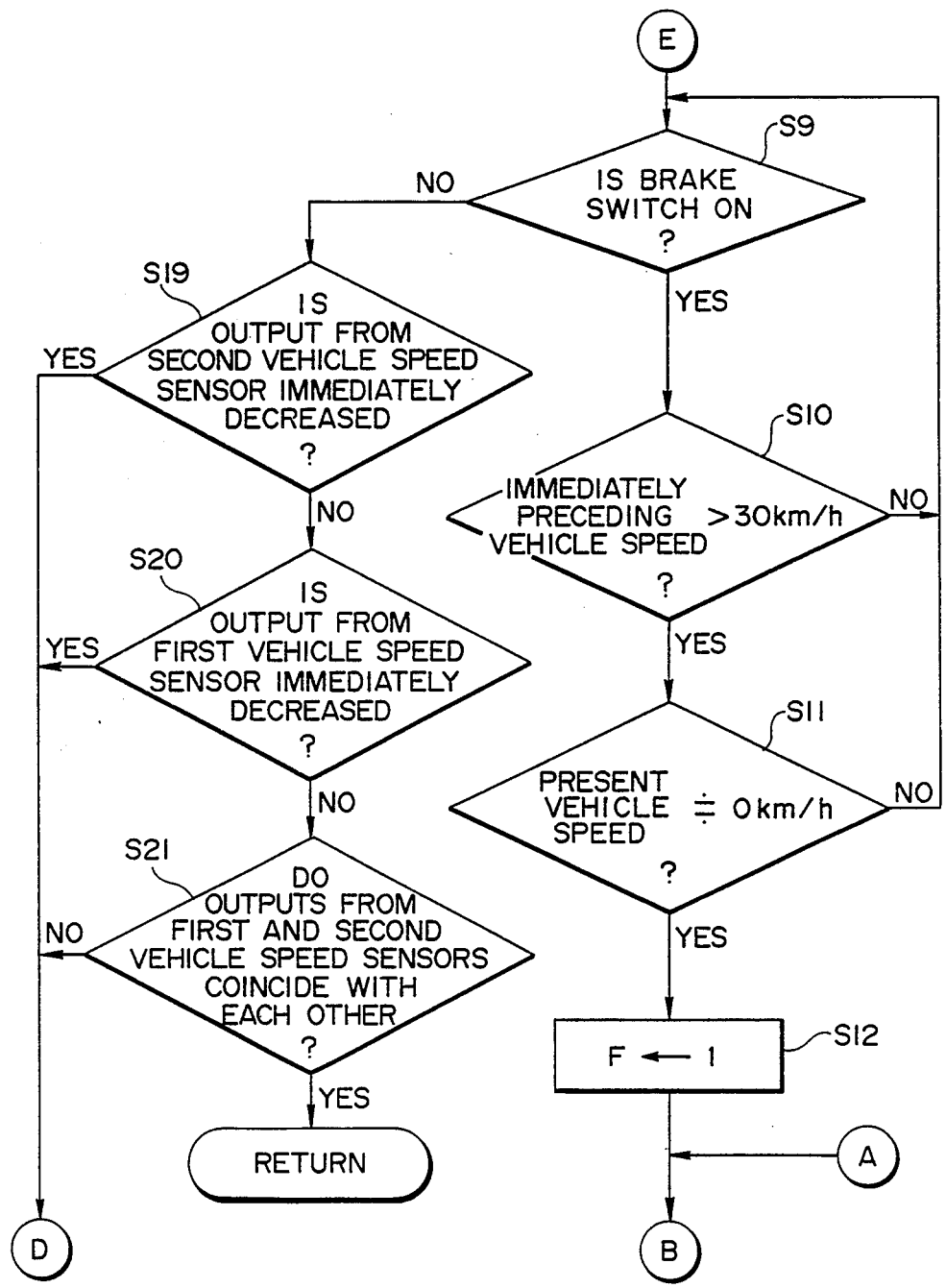
Figure 7C:
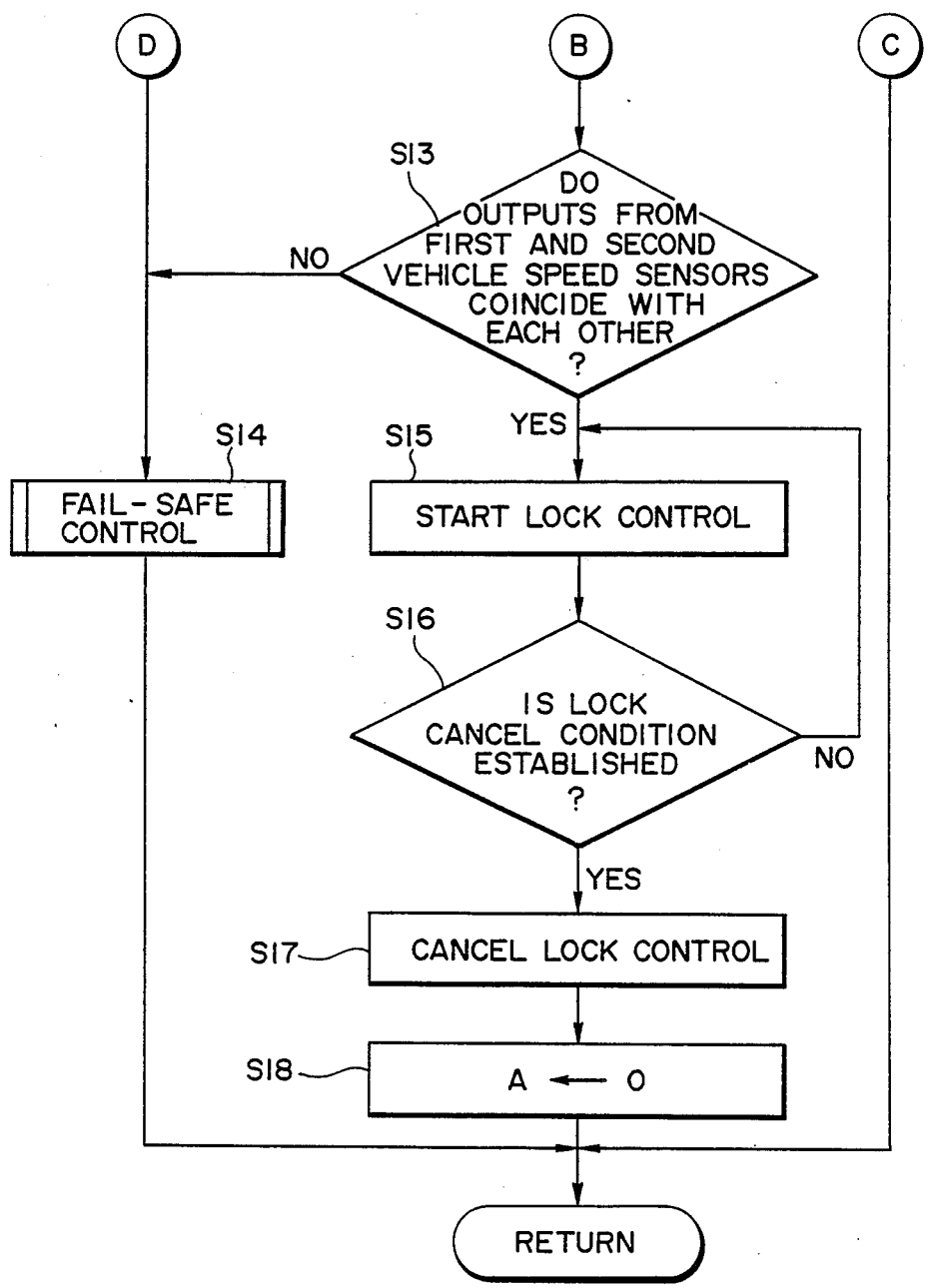

The control sequence shown in FIGS. 7A to 7C is executed every sampling time of 131 msec described above. More specifically, when this control sequence is started, it is checked in step S1 if a lock flag F is "1". The lock flag F is set to be "0" when the control operation is started, and is set to be "0" when the lock detection operation (to be described later) is executed. If the lock flag F is set to be "0" in step S1, the lock detection operation is started. If the lock flag F is set to be "1" in step S1, the flow jumps to step S13 to detect a coincidence/noncoincidence of the outputs from the first and second vehicle speed sensors 122 and 124, as will be described later.

If NO in step S1, i.e., if the lock flag F is "0", a quick increase in vehicle speed caused by wheel spin or chattering of the sensor is discriminated in steps S2 and S3. That is, it is checked in step S2 if an increment D2 of the output from the speedometer side second vehicle speed sensor 124, more specifically, a numerical value D2 defined by a difference in an increasing direction between the vehicle speed detection result detected at the immediately preceding sampling timing and the currently detected vehicle speed detection result is equal to or larger than a predetermined value (in this embodiment, 7 km/h/131 msec). This predetermined value is set to be an acceleration of 7 km/h per sampling time, and corresponds to a change of about 53 km/h per second.

If NO in step S2, i.e., if the increment D2 of the output from the second vehicle speed sensor 124 is smaller than the predetermined value, it is checked in step S3 if an increment D1 of the output from the transaxle side first vehicle speed sensor 122 is equal to or larger than the predetermined value, i.e., 7 km/h/131 msec in this embodiment.

If YES in step S2 or S3, i.e., if the increment D1 of the output from the first vehicle speed sensor 122 or the increment D2 of the output from the second vehicle speed sensor 124 is larger than the predetermined value, it is determined that the vehicle speed is quickly increased, and a flag A indicating a vehicle speed quick increase state is set to be "1" in step S4. When the vehicle speed quick increase flag A is "1", this indicates the vehicle speed quick increase state, and the lock detection operation is inhibited. On the other hand, if the vehicle speed quick increase flag A is "0", this indicates that the vehicle speed quick increase state is not established, and the lock detection operation and the lock control operation are executed.

In the vehicle speed quick increase state, since the lock detection operation is not executed as described above, if this vehicle speed quick increase state is caused by chattering inherent to the sensor, the control sequence returns, and the initial state is recovered.

That is, after the flag A is set to be "1" in step S4, if the vehicle speed quick increase state is caused by chattering, it is checked in step S5 if chattering is terminated. In step S5, if the outputs from both the vehicle speed sensors 122 and 124 are 56 km/h or lower, it is determined that the chattering is terminated. If NO in step S5, that is, if the vehicle speeds detected by the sensors 122 and 124 are 56 km/h or higher and it is determined that chattering is not yet terminated, the lock detection operation must be inhibited from being executed. For this reason, as described above, the control sequence returns to the initial state.

If YES in step S5, that is, if the outputs from both the vehicle speed sensors 122 and 124 are 56 km/h or lower, it is determined that chattering will be terminated soon. In this case, it is checked in step S6 if a predetermined period of time, e.g., 0.786 sec., has passed after the quick increase discrimination was made. When the detected vehicle speed is lowered below 56 km/h, after the lapse of 0.786 sec, it can be determined that chattering is be terminated. Therefore, the above-mentioned judgement is made.

If NO in step S5, that is, if 0.786 sec have not yet passed, since lock detection must be inhibited, the control sequence returns to the initial state. If YES in step S5, i.e., if 0.786 sec have passed, it is determined that the vehicle speed quick increase state is substantially terminated regardless of whether it is caused by wheel spin or chattering. In step S7, the vehicle speed quick increase flag A is set to be "0", and the control sequence returns.

If NO in step S3, that is, if it is determined that the vehicle speed is not quickly increased, it is checked in step S8 if the vehicle speed quick increase flag A is "1". If YES in step S8, that is, if the vehicle speed quick increase state is determined, since the vehicle speed quick increase state is not yet terminated although a quick increase in vehicle speed caused by wheel spin is terminated, the flow returns to step S5 to wait for termination of chattering.

If NO in step S8, that is, if it is determined that the vehicle speed quick increase state is not established, the lock detection operation and the lock control operation are executed.

If the vehicle speed quick increase flag A is "0", it is checked in step S9 if the brake switch 140 is ON. If YES in step S9, that is, if the brake switch 140 is ON, it is checked in step S10 if the vehicle speed detected by the first vehicle speed sensor 122 at the immediately preceding sampling time, i.e., 131 msec before is higher than 30 km/h.

If YES in step S10, that is, if the immediately preceding vehicle speed detection value is higher than 30 km/h, it is checked in step S11 if the vehicle speed detected by the first vehicle speed sensor 122 during the present detection operation is substantially 0 km/h. If YES in step S11, that is, if the currently detected vehicle speed is substantially 0 km/h, since the three conditions for lock detection are satisfied, as described above, lock detection is then executed.

Based on this lock detection, the lock flag F is set to be "1" in step S12. If NO in steps S10 and S11, since lock detection conditions cannot be satisfied, the flow returns to step S9, and step S9 is executed.

After the lock flag F is set to be "1" in step S12, it is checked in step S13 if the detection result of the first vehicle speed sensor 122 coincides with the detection result of the second vehicle speed sensor 124. If NO in step S13, that is, if the detection outputs from both the sensors 122 and 124 do not coincide with each other, this means a failure state. Thus, the fail-safe control operation is executed in step S14, and the flow returns.

If YES in step S13, that is, if both the detected vehicle speeds coincide with each other, since the lock detection is made in a normal state, the lock control operation of the above-mentioned control content is started.

Discrimination of whether or not lock detection is performed in a normal state is necessary for the following reason. As described above, in the lock detection, only the vehicle speed detected by the first vehicle speed sensor 122 is used. If discrimination of the normal state in step S13 is not performed, failure detection cannot be executed although the output from the second vehicle speed sensor 124 is different from that from the first vehicle speed sensor 122, and a failure should be detected. As a result, lock detection may be executed based on the detection result of the first vehicle speed sensor 122 which may not be incorrect.

After the lock control operation is started in step S15, it is checked in step S16 if one of the above-mentioned four lock cancel conditions is satisfied. If NO in step S16, that is, if none of the lock cancel conditions is satisfied, the flow returns to step S15, and the lock control operation is continued.

If YES in step S16, i.e., if one of the lock cancel conditions is satisfied, the lock control operation is canceled, and the normal turning angle ratio control operation is recovered in step S17. In step S18, the vehicle speed quick increase flag A is set to be "0", and the control operation is returned to the initial state.

If NO in step S9, that is, if the brake switch 140 is OFF, the above-mentioned lock detection operation is not executed. In steps S19 and S20, a quick increase in outputs from the vehicle speed sensors 122 and 124 is discriminated for failure detection.

That is, in step S19, a quick increase in output from the first vehicle speed sensor 122 is discriminated. In step S19, it is checked if a decrement El of the output from the transaxle side first vehicle speed sensor 122, more specifically, a numerical value El defined by a difference in a decreasing direction between the vehicle speed detection result detected at the immediately preceding sampling timing and the currently detected vehicle speed detection result is equal to or higher than a predetermined value (in this embodiment, 10 km/h/131 msec). This predetermined value is set to a deceleration of 10 km/h per sampling time, and corresponds to a change of about 76 km/h per second.

If YES in step S19, that is, if the quick increase in vehicle speed detected by the first vehicle speed sensor 122 is determined, a failure is detected, and the flow advances to step S14. Thus, the fail-safe control operation is executed.

If NO in step S19, that is, if the quick increase in vehicle speed from the first vehicle speed sensor 122 is not determined, a quick increase in output from the second vehicle speed sensor 124 is discriminated in step S20. In step S20, it is checked if a decrement E2 of the output from the speedometer side second vehicle speed sensor 124 is equal to or higher than the predetermined value (in this embodiment, 10 km/h/131 msec).

If YES in step S20, that is, if the quick increase in vehicle speed detected by the second vehicle speed sensor 124 is determined, a failure is detected, and the flow jumps to step S14 to execute the fail-safe control operation.

If NO in step S20, that is, if no quick increase in vehicle speed of the first and second vehicle speed sensors 122 and 124 is determined, it is checked in step S21 if the detection result of the first vehicle speed sensor 122 coincides with the detection result of the second vehicle speed sensor 124 as in step S13. If NO in step S21, that is, if the detection outputs from both the sensors 122 and 124 do not coincide with each other, since the failure state has occurred as described above, the flow jumps to step S14 to execute the fail-safe control operation. Thereafter, the flow returns.

If YES in step S21, that is, if the detection outputs from both the vehicle speed sensors 122 and 124 coincide with each other, since no failure state is established, the flow returns to the initial state of the control operation.

In this manner, a series of control operations are completed.

As described above, in this embodiment, the lock state of the wheels is detected, and the lock control operation is executed to avoid danger in the wheel locked state by the vehicle-speed sensitive four-wheel steering apparatus. Therefore, in order to solve the above-mentioned problems, a so-called antilock brake system (ABS) for preventing wheels from being locked need not be employed.

The present invention is not limited to the arrangement of the above-mentioned embodiment, and various changes and modifications may be made within the spirit and scope of the invention.

For example, in the embodiment, in the lock control operation, normal turning angle ratio control indicated by the solid curve I in FIG. 5 is interrupted, and the rear wheel turning angle ratio is controlled in accordance with a characteristic for maintaining a stable travel state of the vehicle. More specifically, the rear turning angle ratio is fixed to a ratio according to the vehicle speed immediately before lock detection.

However, the present invention is not limited to the above-mentioned lock control for stabilization unlike the normal turning angle ratio control, wherein the rear wheel turning angle ratio is fixed to a ratio according to the vehicle speed immediately before lock detection. As shown in a first modification indicated by an alternate long and short dashed curve III in FIG. 5, as a mode for maintaining a stable travel state in lock control, the rear wheel turning angle ratio can be fixed to "0" to forcibly set the 2WS mode.

Although not shown, as a second modification of a mode for setting the stable travel state in the lock control, delay control may be executed In this second modification, when the lock detection is made, although the lock control is performed in accordance with the same characteristic as that in normal turning angle ratio control, its change rate is reduced, that is, the operation speed of the stepping motor is set to be low. As a result, in stabilization lock control in the second embodiment, although the rear wheel turning angle ratio is changed in accordance with the characteristic indicated by the solid curve I in FIG. 5, a time required for changing a rear wheel turning angle ratio to the opposite phase state according to the vehicle speed of 0 km/h detected upon lock detection is prolonged.

More specifically, in a state wherein the brake pedal is kept depressed and the wheels are slipping, when the actual vehicle speed reaches zero due to friction, the rear wheel turning angle ratio is slowly changed from the in-phase side to the opposite phase side, so that it is delayed to be around zero.

In this manner, when the stabilization control content in lock control is set like the first and second modifications, sufficiently stable control can be realized although the control content of the embodiment is stabler. In addition, the lock state is released, and the normal control is recovered at an earlier timing.

In the above embodiment, the rear wheel turning angle ratio is fixed to a ratio according to the detected vehicle speed immediately before lock detection upon lock detection. When the lock state is released and normal turning angle ratio control is restarted, the rear wheel turning angle ratio is set to be a ratio according to the vehicle speed at this time, e.g., a vehicle speed determined to be 0 km/h if the vehicle stands still. For this reason, if the rear wheel turning angle ratio fixed according to lock detection is in the in-phase side, the stepping motor 100 must be driven to change the rear wheel turning angle ratio to the opposite phase side. While the stepping motor 100 is operated in this manner to complete a setting operation to a predetermined rear wheel turning angle ratio, the normal turning angle ratio control operation cannot be started.

In contrast to this, in the first modification, when the lock control operation is canceled, the rear wheel turning angle ratio is fixed to zero, and in the second modification, the rear wheel turning angle ratio becomes substantially zero. In this manner, in the first and second modifications, a time required for recovering normal control can be shortened as compared to the above embodiment, and a timing for substantially recovering the control can be set earlier.

As many apparently widely different embodiments of the present invention can be made without departing from the spirit and scope thereof, it is to be understood that the invention is not limited to the specific embodiments thereof except as defined in the appended claims.

What is claimed is:

1. A rear wheel steering apparatus for an automobile having brake means for braking to wheels, which detects a vehicle speed by vehicle speed detection means and turns rear wheels at a rear wheel turning angle ratio according to the detected vehicle speed upon turning of front wheels, comprising:

discrimination means for discriminating a travel state, including a normal travel state wherein slippage of the wheels has not substantially occurred and a lock state of the wheels wherein the detected vehicle speed is lowered from a predetermined value to substantially zero during actuation of said brake means;

first setting means for, when said discrimination means determines the normal travel state, setting the rear wheel turning angle ratio in accordance with a first characteristic according to the detected vehicle speed; and second setting means for, when said discrimination means determines a lock state of the wheels, setting the rear wheel turning angle ratio in accordance with a second characteristic for stabilization.

2. The rear wheel steering apparatus according to claim 1, wherein said discrimination means determines the lock state of the wheels when a brake switch is turned on, the detected vehicle speed is substantially 0 km/h, and the detected vehicle speed immediately before 0 km/h is not less than 30 km/h.

3. The rear wheel steering apparatus according to claim 1, wherein said second setting means is set to have the second characteristic for stabilization such that the rear wheel turning angle ratio is fixed to a ratio according to the detected vehicle speed immediately before lock detection.

4. The rear wheel steering apparatus according to claim 1, wherein said second setting means is set to have the second characteristic for stabilization such that the rear wheel turning angle ratio is fixed to zero.

5. The rear wheel steering apparatus according to claim 1, wherein said second setting means is set to have the second characteristic for stabilization such that a change rate of the rear wheel turning angle ratio is lowered.

6. The rear wheel steering apparatus according to claim 1, wherein said first setting means sets the rear wheel turning angle ratio in accordance with the detected vehicle speed; and which further comprises
abnormality discrimination means for determining that an output from said vehicle speed detection means is quickly decreased over a predetermined value;
change means for, when said abnormality discrimination means detects that the output from said vehicle speed detection means is quickly decreased, changing turning angle ratio control by said first setting means to fail-safe control in which the rear wheel angle is fixed to zero;
brake detection means for detecting a brake operation state of said brake means; and
inhibition means for, when said brake detection means detects the brake operation state, inhibiting a change from the normal turning angle ratio control to the fail-safe control by said change means.

7. The rear wheel steering apparatus according to claim 6, wherein said vehicle speed detection means comprises a transaxle side first vehicle speed sensor, and a speedometer side second vehicle speed sensor, and detects a quick decrease in output from said vehicle speed detection means when one of said first and second vehicle speed sensors is quickly decreased below a predetermined value.

8. The rear wheel steering apparatus according to claim 6, wherein said first setting means uses a higher value of the output results from the first and second vehicle speed sensors as a detected vehicle speed, and sets the rear wheel turning angle ratio in accordance with the detected vehicle speed.

9. The rear wheel steering apparatus according to claim 1, which further comprises:
inhibition means for, when the detection output from said vehicle speed detection means is quickly increased over a predetermined value, inhibiting setting by said second setting means.

10. The rear wheel steering apparatus according to claim 9, wherein said inhibition means sets the predetermined value to be a value for detecting a wheel spin of the wheels.

11. The rear wheel steering apparatus according to claim 9, wherein said vehicle speed detection means comprises a lead switch type vehicle speed sensor, and said inhibition means sets the predetermined value to be a value for detecting chattering occurring during detection operation.

12. The rear wheel steering apparatus according to claim 1, wherein said second setting means sets a lock control state by changing from the normal first characteristic to the second characteristic for stabilization, and which further comprises cancel means for, when a predetermined condition is satisfied, canceling the lock control state.

13. THe rear wheel steering apparatus according to claim 12, wherein said cancel means changes the rear wheel turning angle ratio from the second characteristic to the first characteristic after a predetermined period of time has passed from detection of the lock state of the wheels, thereby cancelling the lock control state.

14. The rear wheel steering apparatus according to claim 13, wherein said cancel means sets the predetermined period of time to be a time required for, when the brake pedal is kept depressed and a vehicle slips along a road surface while the wheels are locked, stopping the vehicle by friction between the wheels and the road surface.

15. The rear wheel steering apparatus according to claim 12, wherein said cancel means changes the rear wheel turning angle ratio from the second characteristic to the first characteristic when the detected vehicle speed from said vehicle speed detection means substantially coincides with an actual vehicle speed, thereby canceling the lock control state.

16. The rear wheel steering apparatus according to claim 15, wherein said cancel means determines that the detected vehicle speed substantially coincides with the actual vehicle speed when a currently detected vehicle speed coincides with the detected vehicle speed immediately before the lock state of the wheels is detected, and cancels the lock control state.

17. The rear wheel steering apparatus according to claim 12, which further comprises:
brake detection means for detecting a depression state of a brake pedal, and
wherein said cancel means changes the rear wheel turning angle ratio from the second characteristic to the first characteristic when a predetermined period of time has passed after a detected depression of the brake pedal has stopped, thereby cancelling the lock control state.

18. The rear wheel steering apparatus according to claim 17, wherein said cancel means sets the predetermined period of time to be a time required for the wheels to grip a road surface after a braking force is essentially released.

19. The rear wheel steering apparatus according to claim 12, wherein said cancel means changes the rear wheel turning angle ratio from the first characteristic to the second characteristic when a vehicle speed signal other than a signal indicating a vehicle speed of zero is continuously input from said vehicle speed detection means for a predetermined period of time, thereby canceling the lock control state.

20. The rear wheel steering apparatus according to claim 19, wherein said cancel means sets the predetermined period of time to be a time enough for the wheels to grip a road surface.

21. The rear wheel steering apparatus according to claim 1, wherein said vehicle speed detection means comprises a plurality of vehicle speed detection means for detecting a vehicle speed,
said discrimination means discriminates the lock state of the wheels using the detection output from one of said plurality of vehicle speed detection means, and said first and second setting means set the rear wheel turning angle ratio in accordance with the vehicle speeds detected by said plurality of vehicle speed detection means.

22. The rear wheel steering apparatus according to claim 21, wherein said plurality of vehicle speed detection means comprise a transaxle side first vehicle speed sensor, and a speedometer side second vehicle speed sensor.

23. The rear wheel steering apparatus according to claim 22, wherein said discrimination means uses the output from said first vehicle speed sensor as a detected vehicle speed, and performs lock discrimination in accordance with the output from said first vehicle speed sensor.

24. A rear wheel steering apparatus for an automobile, which detects a vehicle speed and turns rear wheels at a rear wheel turning angle ratio according to the detected vehicle speed upon turning of front wheels, comprising:

vehicle speed detection means for detecting a vehicle speed;

setting means for setting a rear wheel turning angle ratio in accordance with the detected vehicle speed;

travel detection means for detecting a travel state of a vehicle;

change means for, when a detection output form said vehicle speed detection means is zero and said travel detection means detects the travel state of the vehicle, changing turning angle ratio control by said setting means to fail-safe control in which the rear wheel turning angle is fixed to zero;

brake detection means for detecting a brake operation state; and inhibition means for, when said brake detection means detects a brake operation state, inhibiting a change from the normal turning angle ratio control to the fail-safe control by said change means.

* * * * *

UNITED STATES PATENT AND TRADEMARK OFFICE
CERTIFICATE OF CORRECTION

PATENT NO. : 4,926,955

DATED : May 22, 1990

INVENTOR(S) : Hiroshi OHMURA, Takashi NAKASHIMA

It is certified that error appears in the above-identified patent and that said Letters Patent is hereby corrected as shown below:

Col. 9, line 62, "58" should be --28--;

Col. 27, line 52, after "executed" insert a period;

Col. 30, line 6, "THe" should be --The--.

Signed and Sealed this

Fourteenth Day of January, 1992

Attest:

HARRY F. MANBECK, JR.

*Attesting Officer*     *Commissioner of Patents and Trademarks*